(12) United States Patent
Zengo et al.

(10) Patent No.: US 11,461,601 B2
(45) Date of Patent: Oct. 4, 2022

(54) CONFIDENTIAL INFORMATION PROVISION DEVICE, IMAGE FORMING APPARATUS AND SYSTEM

(71) Applicant: FUJIFILM Business Innovation Corp., Tokyo (JP)

(72) Inventors: Takeshi Zengo, Ebina (JP); Mamoru Fujita, Ebina (JP); Akira Mihara, Ebina (JP); Atsuyuki Kitamura, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/140,280

(22) Filed: Jan. 4, 2021

(65) Prior Publication Data

US 2022/0067463 A1 Mar. 3, 2022

(30) Foreign Application Priority Data

Aug. 27, 2020 (JP) .............................. JP2020-143489

(51) Int. Cl.
| | | |
|---|---|---|
| *G06K 15/02* | (2006.01) | |
| *C09D 11/50* | (2014.01) | |
| *G07C 9/00* | (2020.01) | |
| *G07C 9/10* | (2020.01) | |
| *G07C 9/20* | (2020.01) | |
| *G08B 21/18* | (2006.01) | |

(52) U.S. Cl.
CPC .......... *G06K 15/1823* (2013.01); *C09D 11/50* (2013.01); *G06K 15/021* (2013.01); *G07C 9/00658* (2013.01); *G07C 9/10* (2020.01); *G07C 9/20* (2020.01); *G07C 9/00309* (2013.01); *G08B 21/18* (2013.01)

(58) Field of Classification Search
CPC .. G06K 15/1823; G06K 15/021; C09D 11/50; C09D 11/03; G07C 9/00658; G07C 9/10; G07C 9/20; G07C 9/00309; G08B 21/18
USPC ........................................ 340/5.7; 106/31.13
See application file for complete search history.

(56) References Cited

U.S. PATENT DOCUMENTS 6,265,122 B1 * 7/2001 Itami .................... G03G 5/0659
430/59.4
7,245,401 B2 * 7/2007 Yamaguchi ............ G06K 7/087
235/493

(Continued)

FOREIGN PATENT DOCUMENTS

| JP | 2004-110689 | 4/2004 |
|---|---|---|
| JP | 2008-090386 | 4/2008 |

(Continued)

OTHER PUBLICATIONS

English language machine translation of JP 2008-090386.
English language machine translation of JP 2008-188868.

*Primary Examiner* — Nam V Nguyen
(74) *Attorney, Agent, or Firm* — Fildes & Outland, P.C.

(57) ABSTRACT

A confidential information provision device includes: an information acquisition unit configured to acquire a confidential level of information that is to be printed on a recording medium; and a provision unit configured to provide confidential information to the recording medium in accordance with the confidential level, the confidential information provided to the recording medium being constituted of a material that is detectable in a non-contact manner.

16 Claims, 12 Drawing Sheets

(56) References Cited

U.S. PATENT DOCUMENTS

| | | | | |
|---|---|---|---|---|
| 7,692,812 | B2* | 4/2010 | Schoedinger | B41J 3/4075 |
| | | | | 358/1.18 |
| 8,049,934 | B2* | 11/2011 | Oshima | B41J 3/50 |
| | | | | 358/1.15 |
| 8,339,679 | B2* | 12/2012 | Tsujii | H04N 1/32577 |
| | | | | 358/3.24 |
| 8,441,664 | B2* | 5/2013 | Fuse | B41J 11/485 |
| | | | | 358/1.9 |
| 11,184,489 | B1* | 11/2021 | Mihara | H04N 1/00342 |
| 2002/0170973 | A1* | 11/2002 | Teraura | G06K 19/0723 |
| | | | | 235/492 |
| 2004/0066522 | A1 | 4/2004 | Yamaguchi et al. | |
| 2005/0029353 | A1* | 2/2005 | Isemura | H04N 1/00127 |
| | | | | 235/454 |
| 2005/0209980 | A1* | 9/2005 | Ishii | G06Q 10/0637 |
| | | | | 705/406 |
| 2006/0102718 | A1* | 5/2006 | Kajino | G06Q 10/087 |
| | | | | 235/385 |
| 2006/0132816 | A1* | 6/2006 | Yamamoto | B41J 3/44 |
| | | | | 358/1.13 |
| 2008/0304098 | A1 | 12/2008 | Fuse et al. | |
| 2011/0159215 | A1* | 6/2011 | Seguchi | G09F 15/02 |
| | | | | 428/32.22 |
| 2020/0106914 | A1* | 4/2020 | Sawai | H04N 1/0285 |
| 2020/0218187 | A1* | 7/2020 | Takahashi | G03G 15/5016 |
| 2020/0293848 | A1* | 9/2020 | Mochizuki | G06K 19/0672 |

FOREIGN PATENT DOCUMENTS

| | | |
|---|---|---|
| JP | 2008-188868 | 8/2008 |
| JP | 4849012 | 10/2011 |

* cited by examiner

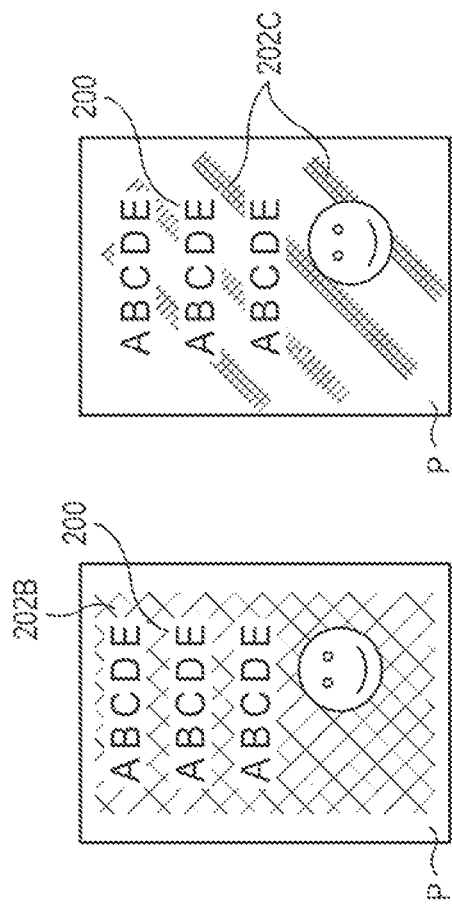
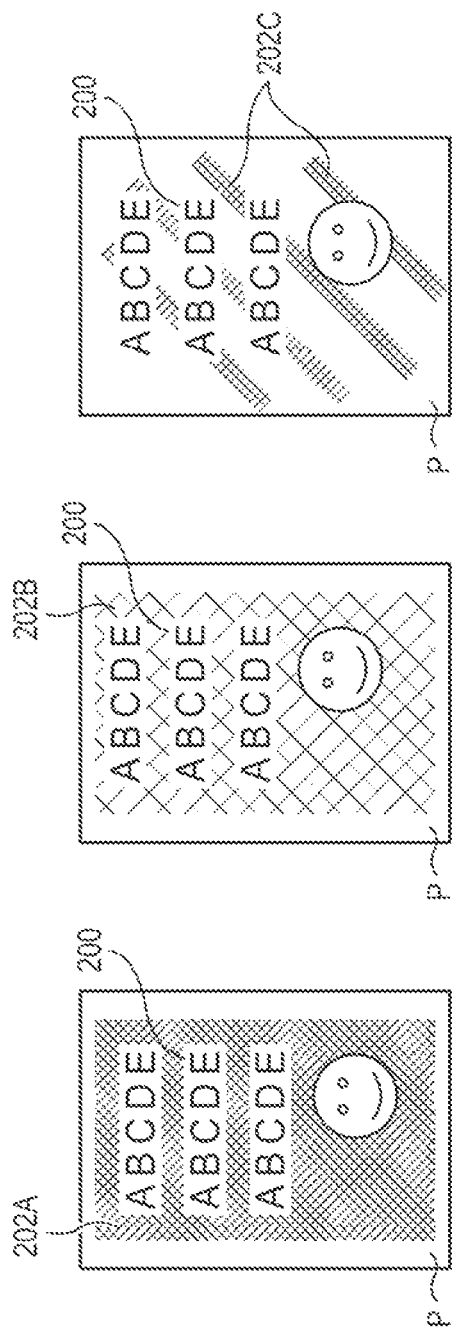
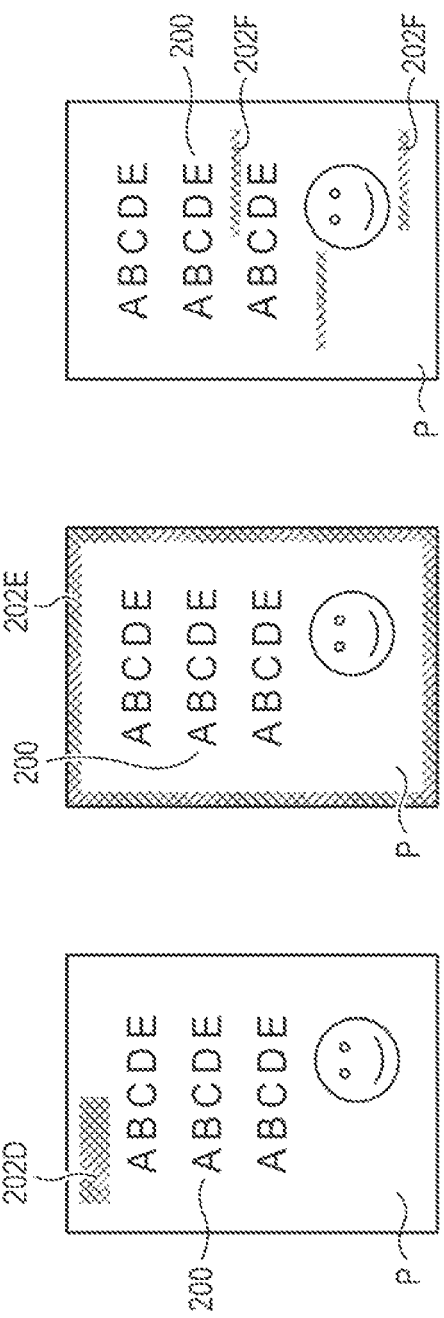
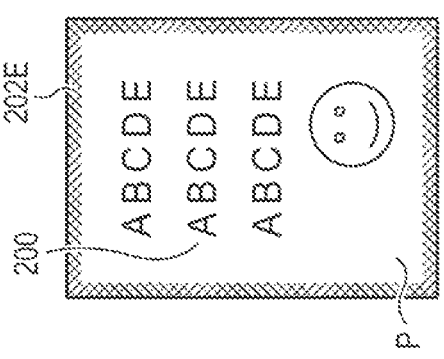
FIG. 4A  FIG. 4B  FIG. 4C  FIG. 4D  FIG. 4E  FIG. 4F

CONFIDENTIAL INFORMATION PROVISION DEVICE, IMAGE FORMING APPARATUS AND SYSTEM

CROSS-REFERENCE TO RELATED APPLICATIONS

This application is based on and claims priority under 35 USC 119 from Japanese Patent Application No. 2020-143489 filed on Aug. 27, 2020.

BACKGROUND

Technical Field

The present disclosure relates to a confidential information provision device, an image forming apparatus and a system.

Related Art

For example, Japanese Patent No. 4,849,012 discloses a detection system including an acquisition means for acquiring document data indicative of a document having plural pages, a supply means for supplying any one of a first sheet including a to-be-detected object and a second sheet not including the to-be-detected object, a selection means for selecting any one of the first and second sheets for each page of the document, a printing means for sequentially printing the document indicated by the document data acquired by the acquisition means on the sheets that are selected by the selection means and sequentially supplied by the supply means, and a policy acquisition means for acquiring policy information about a security level of the document, the information being information indicative of a ratio of the first sheet to the second sheet, wherein the selection means includes a printing apparatus configured to sequentially select the first or second sheet according to the ratio and in a random order, and a detection apparatus including a detection means for detecting a to-be-detected object included on the sheet on which a document is printed by the printing apparatus and a notification means for issuing a notification when the to-be-detected object is detected by the detection means.

For example, JP-A-2008-090386 discloses a print system including a print apparatus and a print request terminal configured to perform a print request by transmitting print information to the print apparatus, wherein the print apparatus includes a detection means for detecting whether a specific sheet whose existence is remotely detectable is in a print ready state, a transmission means for transmitting, to the print request terminal, a signal indicating that the detection means detects that the specific sheet is in a print ready state, and a print control means for printing print information, which designates the specific sheet, by using the specific sheet upon print request of the print information, and wherein the print request terminal includes a recognition means for recognizing an attribute provided to the print information, a receiving means for receiving the signal transmitted by the transmission means and indicating that the specific sheet is in a print ready state, and a transmission control means for, in a case where an attribute recognized by the recognition means is an attribute allowing print of only the specific sheet, when the signal indicating that the specific sheet is in a print ready state is received by the receiving means, controlling so as to allow transmission of the print request of the print information, which designates the specific sheet, to the print apparatus.

For example, JP-A-2004-110689 discloses an additional information recording apparatus to a print medium including an information input means for inputting image information that is a print target by an image forming apparatus and additional information corresponding to the image information, and an additional information forming means for forming a magnetic tag according to a content of the additional information input from the information input means on a print medium on which the corresponding image information is to be printed, wherein the additional information corresponding to the image information is remotely readable from the magnetic tag recorded on the print medium.

SUMMARY

In some document management technology in the related art, a recording medium having a structure attached thereon or a magnetic body embedded therein is used. In some cases, a special recording medium needs to be used.

Aspects of non-limiting embodiments of the present disclosure relate to a confidential information provision device, an image forming apparatus, and a system capable of providing confidential information which is detectable in a non-contact manner to any location on a recording medium during a print process in a case where contents to be printed on the recording medium are confidential.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a confidential information provision device including: an information acquisition unit configured to acquire a confidential level of information that is to be printed on a recording medium; and a provision unit configured to provide confidential information to the recording medium in accordance with the confidential level, the confidential information provided to the recording medium being constituted of a material that is detectable in a non-contact manner.

BRIEF DESCRIPTION OF DRAWINGS

Exemplary embodiment(s) of the present invention will be described in detail based on the following figures, wherein:

FIG. 4A depicts a first example of the image for detection provided together with the image on the recording medium by the image forming apparatus in accordance with the first exemplary embodiment;

FIG. 4B depicts a second example of the image for detection provided together with the image on the recording medium by the image forming apparatus in accordance with the first exemplary embodiment;

FIG. 4C depicts a third example of the image for detection provided together with the image on the recording medium by the image forming apparatus in accordance with the first exemplary embodiment;

FIG. 4D depicts a fourth example of the image for detection provided together with the image on the recording medium by the image forming apparatus in accordance with the first exemplary embodiment;

FIG. 4E depicts a fifth example of the image for detection provided together with the image on the recording medium by the image forming apparatus in accordance with the first exemplary embodiment;

FIG. 4F depicts a sixth example of the image for detection provided together with the image on the recording medium by the image forming apparatus in accordance with the first exemplary embodiment;

DETAILED DESCRIPTION

Figure 1:
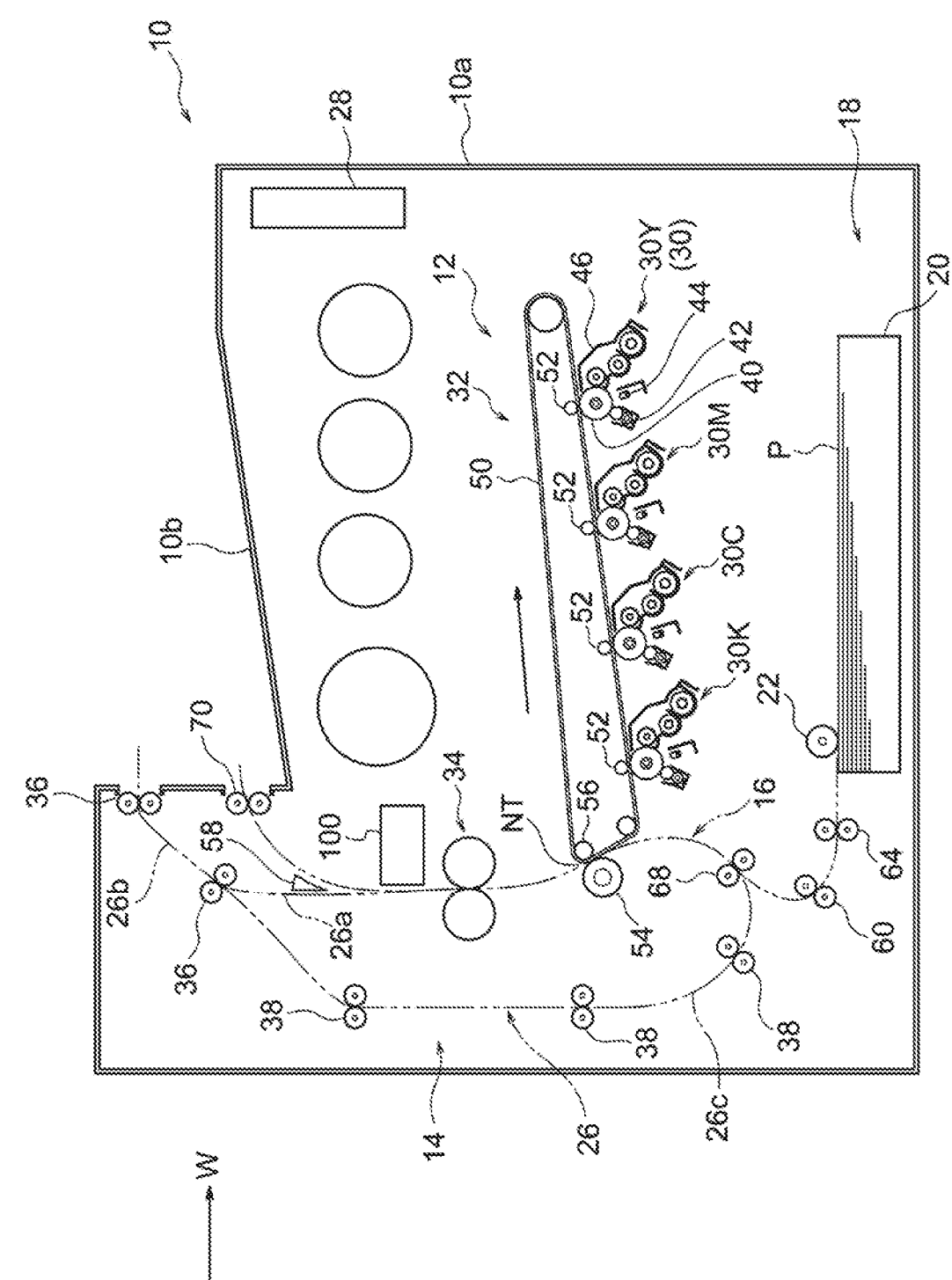
FIG. 1 is a schematic view depicting an image forming apparatus in accordance with a first exemplary embodiment.

Hereinbelow, exemplary embodiments of the present disclosure will be described with reference to the drawings. Note that, arrows H shown in the drawings indicate a vertical direction indicating an upper and lower direction of an apparatus, arrows W indicate a horizontal direction indicating a width direction of the apparatus, and arrows D indicate a horizontal direction indicating an inner direction of the apparatus.

First Exemplary Embodiment

FIG. 1 is a schematic view depicting a configuration of an image forming apparatus 10 in accordance with a first exemplary embodiment.
(Overall Configuration of Image Forming Apparatus)

As shown in FIG. 1, the image forming apparatus 10 includes an image forming unit 12 configured to form a toner image by an electrophotographic method, an accommodation unit 18 configured to accommodate recording media P, and a control unit 28 configured to control each unit. The image forming apparatus 10 also includes a conveyor unit 14 configured to convey the recording medium P accommodated in the accommodation unit 18 toward the image forming unit 12 along a conveying path 16, to convey the recording medium P conveyed along the conveying path 16 along a reversal path 26 to reverse the front and back of the recording medium P and to again convey the same toward the image forming unit 12. Here, the toner image is an example of the image. Note that, the image forming method by the image forming unit 12 is not limited to the electrophotographic method, and may also be an inkjet method, for example.

The image forming apparatus 10 also includes a confidential information provision device 100 arranged downstream of a pan facing the image forming unit 12 with respect to a conveying direction of the recording medium P. The confidential information provision device 100 is configured to provide confidential information to the recording medium P. The confidential information provision device 100 will be described later.

The recording medium P is a recording medium having a base material formed of paper, or having a coat layer formed on the base material, for example. That is, the recording medium P is different from a special recording medium to which a structure such as an IC (Integrated Circuit) chip is attached or in which a magnetic body is embedded.

An overall configuration and operations of the image forming apparatus 10 are first described with the confidential information provision device 100 being omitted. In the image forming apparatus 10, the toner image formed by the image forming unit 12 is formed on a surface of the recording medium P that is conveyed along the conveying path 16. The recording medium P having the toner image formed thereon is discharged to an outside of an apparatus main body 10a.

In the meantime, when forming a toner image on a backside of the recording medium P, the recording medium P having the toner image formed on the surface is conveyed along the reversal path 26, and a toner image again formed by the image forming unit 12 is formed on the backside of the recording medium P. Then, the recording medium P is discharged to an outside of the apparatus main body 10a.
[Image Forming Unit 12]

The image forming unit 12 includes plural toner image forming units 30 each configured to form a toner image of each color, and a transfer unit 32 configured to transfer the toner images formed in the toner image forming units 30 to the recording medium P. The image forming unit 12 also includes a fixing device 34 configured to fix the toner images transferred to the recording medium P by the transfer unit 32 onto the recording medium P.

Plural toner image forming units 30 are provided so as to form a toner image of each color. In the present exemplary embodiment, the toner image forming units 30 of four colors of yellow (Y), magenta (M), cyan (C) and black (K) are provided. Note that, in descriptions below, when it is not necessary to distinguish yellow (Y), magenta (M), cyan (C) and black (K), Y, M, C, and K annexed to the reference signs are omitted.

The toner image forming units 30 of each color are basically similarly configured except toners to be used. More specifically, the toner image forming unit 30 includes a cylindrical image carrier 40 configured to rotate, and a charging device 42 configured to electrically charge the image carrier 40. The toner image forming unit 30 also includes an exposure device 44 configured to irradiate the electrically charged image carrier 40 with exposure light to form an electrostatic latent image, and a developing device 46 configured to develop, as a toner image, the electrostatic latent image by a developing agent G including toner. Thereby, in the toner image forming unit 30 of each color, a toner image of each color is formed using toner of each color.

The image carrier 40 of each color is in contact with a transfer belt 50 configured to circulate. The toner image forming units 30 of yellow (Y), magenta (M), cyan (C) and black (K) are aligned side by side in corresponding order from an upstream side with respect to a circulation direction (refer to an arrow in FIG. 1) of the transfer belt 50.

The transfer unit 32 includes a transfer belt 50 wound on plural rolls (reference signs thereof are omitted) and configured to circulate in an arrow direction in FIG. 1, and primary transfer rolls 52 each arranged on an opposite side to the image carriers 40 of each color with the transfer belt 50 being interposed therebetween and each configured to transfer the toner images formed on the image carriers 40 of each color to the transfer belt 50.

The transfer unit 32 also includes a winding roll 56 on which the transfer belt 50 is wound and a secondary transfer roll 54 arranged on an opposite side to the winding roll 56 with the transfer belt 50 being interposed therebetween and configured to transfer the toner images transferred onto the transfer belt 50 to the recording medium P. A transfer nip NT for transferring the toner image to the recording medium P is formed between the secondary transfer roll 54 and the transfer belt 50.

In the above configuration, the toner images are primarily transferred onto the transfer belt 50 in order of yellow (Y), magenta (M), cyan (C) and black (K) by the primary transfer rolls 52. In the meantime, the toner images are transferred from the transfer belt 50 to the recording medium P that is conveyed nipped between the transfer belt 50 and the secondary transfer roll 54. The recording medium P having the toner images transferred thereto is delivered to the fixing device 34.

The fixing device 34 is arranged downstream of the transfer nip NT with respect to the conveying direction of the recording medium P. The fixing device 34 is configured to heat and pressurize the toner images transferred to the recording medium P and to fix the toner images on the recording medium P while conveying the recording medium P.

[Accommodation Unit 18]

The accommodation unit 18 includes an accommodation member 20 capable of accommodating the recording medium P, and a delivery roll 22 configured to deliver the uppermost recording medium P stacked in the accommodation member 20 to the conveying path 16,

[Conveyor Unit 14]

The conveyor unit 14 is arranged on one side (the left in FIG. 1) in a width direction of the apparatus with respect to the accommodation unit 18, and is configured to convey the recording medium P along the conveying path 16 in which the recording medium P delivered from the accommodation member 20 is conveyed. When forming a toner image on a backside of the recording medium P, the conveyor unit 14 conveys the recording medium P along the reversal path 26 for reversing the front and back by reversing (switching back) the conveying direction of the recording medium P.

The conveyor unit 14 includes a first conveying roll 64 configured to convey the recording medium P delivered from the accommodation member 20 along the conveying path 16, and a second conveying roll 60. The conveyor unit 14 also includes a stop roll 68 configured to convey the recording medium P along the conveying path 16, and a discharge roll 70. The secondary transfer roll 54 and the fixing device 34 are arranged between the stop roll 68 and the discharge roll 70.

The conveyor unit 14 also includes switching rolls 36 configured to convey the recording medium P along the reversal path 26 for reversing the front and back by reversing the conveying direction of the recording medium P, conveying rolls 38, and a switching member 58 configured to guide the recording medium P conveyed along the conveying path 16 to the reversal path 26.

The reversal path 26 has a branched path 26a branched from a part on a downstream side of the conveying path 16, and a switching path 26b extending from the branched path 26a, and the recording medium P is switched back along the switching path 26b. The reversal path 26 also has a i-shaped path 26c extending from an end portion of the switching path 26b in a direction different from the branched path 26a, and configured to guide the recording medium P toward the stop roll 68.

The conveyor unit 14 includes the two switching rolls 36 configured to switch back the recording medium P entering the switching path 26b from the branched path 26a, and the three conveying rolls 38 configured to convey the recording medium P switched back and entering the J-shaped path 26c toward the stop roll 68.

In the conveyor unit 14, when forming an image on the backside of the recording medium P, the switching member 58 guides the recording medium P having a toner image formed on the surface to the branched path 26a. The two switching rolls 36 receive and switch back the recording medium P entering the switching path 26b from the branched path 26a, thereby reversing the front and back of the recording medium P and conveying the same toward the J-shaped path 26c. The three conveying rolls 38 receive the recording medium P entering the J-shaped path 26c from the switching path 26b, convey the recording medium P toward the stop roll 68, and cause a tip end of the recording medium P to butt the stop roll 68. The stop roll 68 rotates in conformity to a timing at which a toner image is transferred, thereby conveying the recording medium P toward the transfer nip NT.

(Operations of Overall Configuration)

In the image forming apparatus 10, an image is formed as follows.

First, the charging device 42 of each color uniformly negatively charges a surface of the image carrier 40 of each color at a predetermined potential. Continuously, the exposure device 44 irradiates the electrically charged surface of the image carrier 40 of each color with exposure light, thereby forming an electrostatic latent image. The developing device 46 of each color develops the electrostatic latent image, thereby visualizing the same as a toner image. The toner image formed on the surface of the image carrier 40 of each color is transferred to the transfer belt 50 in order by the primary transfer roll 52.

The recording medium P delivered from the accommodation member 20 to the conveying path 16 by the delivery roll 22 is delivered to the transfer nip NT in which the transfer belt 50 and the secondary transfer roll 54 are in contact with each other. In the transfer nip NT, the recording medium P is conveyed between the transfer belt 50 and the secondary transfer roll 54, so that the toner images on the transfer belt 50 are transferred to a surface of the recording medium P.

The toner images transferred to the surface of the recording medium P are fixed on the recording medium P by the fixing device 34. Then, the recording medium P having the toner images fixed thereon is discharged to the discharge part 10*b* outside of the apparatus main body 10*a* by the discharge roll 70.

In the meantime, when forming a toner image on the backside of the recording medium P, the recording medium P having the toner images formed on the surface is conveyed along the reversal path 26, so that the front and back of the recording medium are reversed and the recording medium is again conveyed to the transfer nip NT. Then, toner images formed via the processes similar to the above-described processes are transferred to the backside of the recording medium P. The toner images transferred to the backside of the recording medium P are fixed on the recording medium P by the fixing device 34. Then, the recording medium P having the toner images fixed thereon is discharged to the discharge part 10*b* outside of the apparatus main body 10*a* by the discharge roll 70.

(Configuration of Main Parts)

Subsequently, the confidential information provision device 100 and a configuration relating to the same are described.

As shown in FIG. 1, the confidential information provision device 100 is arranged downstream of the transfer unit 32 in which the toner images are transferred by the image forming unit 12 and the fixing device 34 with respect to the conveying direction of the recording medium P. The confidential information provision device 100 is arranged on the same side as the image forming unit 12 with respect to the conveying path 16 along which the recording medium P is conveyed.

[Confidential Information Provision Device 100]

The confidential information provision device 100 is configured to provide confidential information to the recording medium P, according to a confidential level of an image that is formed on the recording medium P by the image forming unit 12. In the image forming apparatus 10, for example, when a confidential level for confidentially managing an image that is formed on the recording medium P by the image forming unit 12 is higher than a predetermined level, confidential information is provided to the recording medium P by the confidential information provision device 100. In the present disclosure, the "confidential management" refers to managing information (hereinbelow, referred to as "confidential information") about an image that should be kept in a confidential state so as to keep it in the confidential state. In the present disclosure, exemplary embodiments of the "confidential management" include four following examples. First, the confidential information is recorded on a recording medium that meets a predetermined requirement. Second, a recording medium on which the confidential information is recorded and a recording medium on which the confidential information is not recorded are identified. Third, a recording medium on which the confidential information is recorded is kept in a building or a room that meets a predetermined requirement. Fourth, a recording medium on which the confidential information is recorded is not taken out from any building or room. The "confidential information" refers to information that is annexed to the recording medium P for management so as to keep it in the confidential state. The "confidential information" is information that is detectable by a detection apparatus ISO (refer to FIG. 6), which will be described later.

Figure 2:
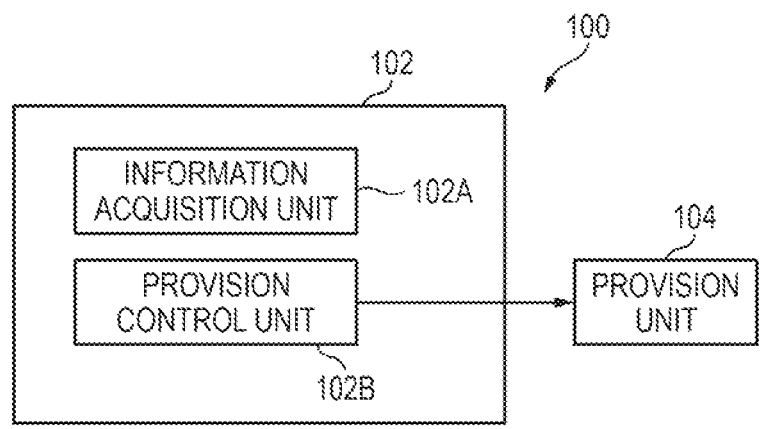
FIG. 2 is a block diagram depicting an example of a functional configuration of a control unit of a confidential information provision device that is used for the image forming apparatus in accordance with the first exemplary embodiment.

As shown in FIG. 2, the confidential information provision device 100 includes a control unit 102, and a provision unit 104 configured to provide the confidential information to the recording medium P. The control unit 102 includes an information acquisition unit 102A configured to acquire a confidential level of information about an image that is to be printed on the recording medium P, and a provision control unit 102B configured to control an operation of the provision unit 104. Although not shown, the control unit 102 includes a CPU (Central Processing Unit: processor), and a storage unit such as a storage.

As an example, the control unit 102 determines whether the confidential level (i.e., a confidential management level) of the information about the image acquired by the information acquisition unit 102A is higher than the predetermined level. In the storage unit (not shown) provided to the control unit 102, for example, a table indicative of confidential information such as a keyword, a sentence, a figure and the like that should be confidentially managed is stored. The control unit 102 compares the information about the image and the confidential information of the table, and determines whether the confidential level of the information about the image is higher than the predetermined level. As another example, the information acquisition unit 102A may acquire a confidential level of an image from an outside of the confidential information provision device 100.

When it is determined that the confidential level of the information about the image is higher than the predetermined level, the control unit 102 causes the provision unit 104 to operate by the provision control unit 102B, thereby providing the confidential information to the recording medium P.

The provision unit 104 of the confidential information provision device 100 has only to provide the confidential information to the recording medium P, and an image forming method the provision unit 104 uses is not limited. The provision unit 104 of the confidential information provision device 100 may use the image forming method selected from an electrophotographic method, a droplet ejection method such as an inkjet, a stamping method, a coating method, a silk printing method, and the like.

As shown in FIG. 1, in the image forming apparatus 10, when conveying the recording medium P along the reversal path 26, the confidential information provision device 100 is arranged in a position facing the backside of the recording medium P. Thereby, only an image 200 may be formed on the surface of the recording medium P. and an image for detection 202 may be formed on the backside of the recording medium P. Even when the image for detection 202 is formed on the backside of the recording medium P, the recording medium P to which the image for detection 202 is provided is detected by the detection apparatus 150.

Figure 3:
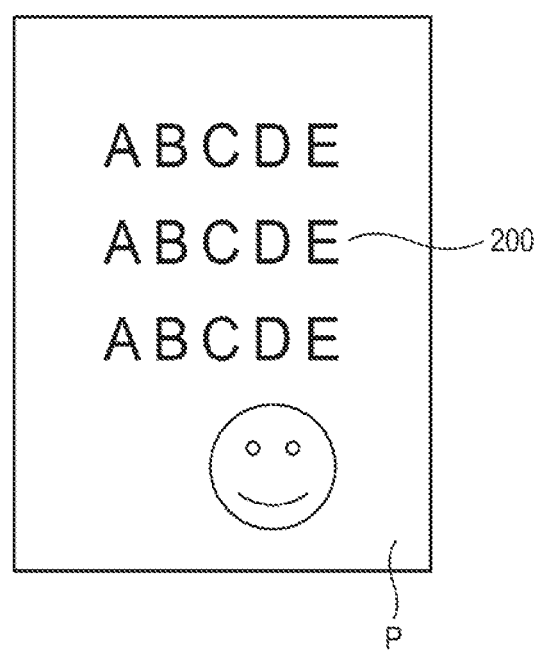
FIG. 3 depicts an example of an image formed on a recording medium by the image forming apparatus in accordance with the first exemplary embodiment.

FIG. 3 depicts an example of the image 200 that is formed on the recording medium P by the image forming unit 12. As shown in FIG. 3, the usual image 200 by toner is formed on the recording medium P by the image forming unit 12.

FIGS. 4A-4F depict examples of the image for detection that is provided to the recording medium P by the confidential information provision device 100 when a confidential level of the image 200 formed on the recording medium P is higher than the predetermined level. The image for detection is an example of the confidential information. As shown in FIG. 4A, the confidential information provision device 100 may provide an image for detection 202A consisting of a solid image or a fine mesh pattern on a substantially entire surface of the recording medium P except an edge portion. The image for detection 202A is provided in a position of the recording medium P overlapping the image 200. As shown in FIG. 4B, the confidential information provision device 100 may provide an image for detection 202B of a coarse mesh pattern on the substantially entire surface of the recording medium P except an edge portion. The image for detection 202B is provided in a position of the recording medium P overlapping the image 200. As shown in FIG. 4C, the confidential information provision device 100 may provide an image for detection 202C consisting of a stripe pattern in an area of the recording medium P except an edge portion. In FIG. 4C, the image for detection 202C consists of a stripe pattern arranged in an oblique direction. Instead of this, a stripe pattern may also be arranged in a vertical or horizontal direction.

As shown in FIG. 4D, the confidential information provision device 100 may provide an image for detection 202D consisting of a solid image or a fine mesh pattern on a part of the recording medium P. The image for detection 202D is a rectangular image provided at a right upper part of the recording medium P, and is provided in a position of the recording medium P in which the image for detection 202D does not overlap the image 200. As shown in FIG. 4E, the confidential information provision device 100 may also provide an image for detection 202E consisting of a solid image or a fine mesh pattern having a frame shape along an edge portion of the recording medium P. The image for detection 202E is provided in a position of the recording medium P in which the image for detection 202E does not overlap the image 200. As shown in FIG. 4F, the confidential information provision device 100 may also provide images for detection 202F each having a band shape at plural places of the recording medium P. The images for detection 202F are provided in positions of the recording medium P in which the images for detection 202F do not overlap the image 200.

Figure 5:
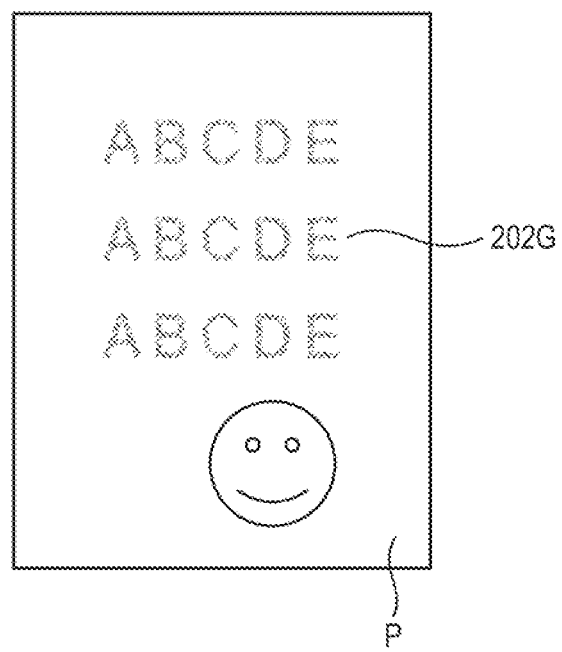
FIG. 5 depicts a seventh example of the image for detection provided on the recording medium by the image forming apparatus in accordance with the first exemplary embodiment.

As shown in FIG. 5, in a case where a material provided by the confidential information provision device 100 is a visible material, an image for detection 202G consisting of a document (for example, a word, a sentence) may also be provided to the recording medium P.

In an example according to the exemplary embodiment of the present disclosure, the confidential information provision device 100 provides any one of the images for detection 202A to 202O to the recording medium P, for example. Since any one of the images for detection 202A to 202G may be selected, when it is not necessary to identify the positions and shapes of the images for detection, the image for detection is described as an image for detection 202 without indicating the reference signs of A to G.

Note that, the position and shape of the image for detection as an example of the confidential information that is provided to the recording medium P are not limited to the positions and shapes of the images for detection 202A to 202G, and may be changed. For example, in a case where the image for detection is provided on the surface of the recording medium P, the image for detection 202D to 202G may be arranged in the position in which recording and reading of a document are not disturbed, as shown in FIGS. 4D to 4F. In a case where the image for detection is provided on the backside of the recording medium, it may be formed to have a shape such as a solid coating on an entire surface, a mesh pattern on an entire surface and a stripe pattern on an entire surface. When the image for detection is formed to have a shape such as a solid coating on an entire surface, a mesh pattern on an entire surface and a stripe pattern on an entire surface, the image for detection may be prevented from being cut, so that the recording medium P having the image for detection provided thereto may be prevented from being taken out. In a case where the image for detection is composed of an invisible material, it may be formed to have a shape such as a solid coating on an entire surface, a mesh pattern on an entire surface and a stripe pattern on an entire surface, as shown in FIGS. 4A to 4C, for example.

[Provision Material that is Used in Confidential Information Provision Device 100]

Subsequently, a provision material that is used in the confidential information provision device 100 is described. In an example according to the exemplary embodiment of the present disclosure, a volatile material is used as a provision material constituting the image for detection 202. The volatile material is attached to the surface of the recording medium P to form the image for detection 202, and enables the image for detection 202 to be detected in a non-contact manner by the detection apparatus 150. The volatile material is used for the image for detection 202, so that a volatile gas is generated from the image for detection 202 and is detected by the detection apparatus 150. The image for detection 202 may generate the volatile gas having a concentration that is detectable by the detection apparatus 150 when passing through the detection apparatus 150 while being attached to the recording medium P.

Figure 6:
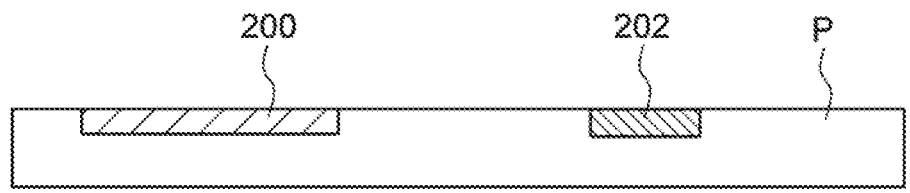
FIG. 6 is a sectional view depicting a state of the recording medium on which the image and the image for detection are provided by the image forming apparatus in accordance with the first exemplary embodiment.

FIG. 6 is a sectional view depicting a state of the image 200 and the image for detection 202 formed on the recording medium P. As shown in FIG. 6, the image 200 and the image for detection 202 permeate the recording medium P from the surface into paper fiber, and thicknesses of parts where the image 200 and the image for detection 202 are provided to the recording medium P are equivalent to a thickness of the recording medium P. Rigidities of the parts where the image 200 and the image for detection 202 are provided to the recording medium P are also equivalent to rigidity of the recording medium P.

Figure 16:
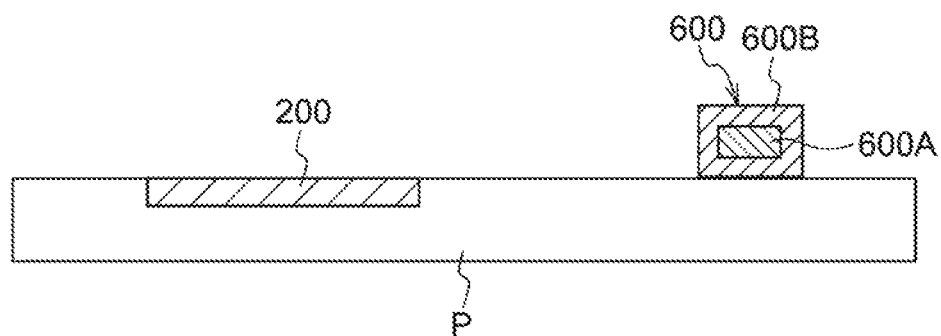
FIG. 16 is a sectional view depicting a state of a recording medium of a comparative example, on which a structure is provided together with an image.

FIG. 16 depicts Comparative Example where a structure 600 is attached on the surface of the recording medium P. As shown in FIG. 16, the structure 600 is attached on the surface of the recording medium P by a gluing agent or an adhesive. The structure 600 includes, for example, a magnetic body 600A, and a protection layer 600B that surrounds the magnetic body 600A. A thickness of a part of the recording medium P where the image 200 is formed is substantially the same as a thickness of the recording medium P. However, since the structure 600 protrudes from the surface of the recording medium P, a thickness of a part of the recording medium P where the structure 600 is provided is greater than the thickness of the recording medium P.

For example, the thickness of the recording medium P is 100 μm and a thickness of the structure 600 is 100 μm. Thereby, for example, when the 10 recording media P are overlapped, the thickness of the part where the structure 600 is provided increases by 1 mm. When the 100 recording media P are overlapped, the thickness of the part where the structure 600 is provided increases by 10 mm. For this reason, when the recording medium P is provided with the structure 600, handleability of the recording medium P may be deteriorated.

In contrast, the recording medium P where the image for detection 202 is formed by the volatile material of the present disclosure is superior in handleability to the special recording medium to which the structure 600 is attached. When the volatile material of the present disclosure is used, it is advantageous that there are few restrictions on a type of the recording medium on which the image for detection 202 is to be formed, the manufacturing cost of the recording medium having the image for detection is low, and the thickness of the recording medium having the image for detection is relatively thin and highly uniform, which improves a stacking property.

For the volatile material of the present disclosure, a flavoring that is used in cosmetics, foods, air fresheners and the like may be used, for example. The flavoring that is used in cosmetics, foods, air fresheners and the like is excellent in terms of safety and stability. For example, in a case where a liquid composition such as ink is used in the confidential information provision device 100, a flavoring suitable for the liquid composition may be selected. In general, synthetic flavorings are cheaper and may be more easily used than natural flavorings.

Examples of the flavoring are described. In order to form the image for detection, at least one selected from following flavorings may be contained.

<Scent of Flower (Floral)>

For example, the flavoring may be selected from benzyl acetate, geraniol, methyl epi-jasmonate, lavandulol, β-phenylethyl alcohol, geranyl acetate, n-octanol, 1-decanol, hydroxycitronellal, α-amylcinnamic aldehyde and the like.

<Scent of Fruit (Fruity)>

For example, the flavoring may be selected from citral, citronellal, limonene, 3-methylbutyl acetate, γ-hexalactone, γ-jasmolactone, ethyl phenylglycidate, 4,7-dimethylbicyclo[3.2.1] oct-3-en-6-one, 3-methyl-3-buten-1-ol, 3-hydroxy-β-damascone, pentan-2-thiol, 3-hydroxy-2-ethyl-γ-pyrone, 3-ethoxy-4-hydroxybenzaldehyde, 2, 5-dimethyl-4,5-hydroxy-3(2H)-furanone and the like.

<Others>

In addition, the flavoring may be selected from vanillin, menthol, allyl isothiocyanate, 1-carvone, cyclopentadecanolide, nitromusks, cedrol, germacrene B and the like.

The material constituting the image for detection may be odorless to persons in a volatilized state or have a concentration at which it cannot be recognized in a volatilized state with human olfaction. Examples of volatile materials that are odorless to persons include organic compounds containing a hydroxyl group or a hydroxyl group and an ether group. Examples of these organic compounds include alcohols, glycols, glycol ethers and the like.

Examples of odorless volatile materials include ethylene glycol, diethylene glycol, propylene glycol, 1,3-butanediol, triethylene glycol, and the like, as glycols. Examples of alcohols include glycerin, and the like. Examples of glycol ethers include methyl carbitol, ethyl carbitol, butyl carbitol, propylene glycol monomethyl ether, and the like. Other examples having an ether group and an alcohol group include tert-butyl cellosolve, solfit, and the like.

As a method of evaluating odorlessness, a 6-step odor intensity scale may be used. In the 6-step odor intensity scale, a scale 0 or 1 is set as odorlessness. The evaluation may be performed by a qualified odor examiner. A concentration at which the scale is 0 or 1 is a concentration that cannot be detected with human olfaction. A volatile material that has been confirmed as being safe by known safety evaluation may be used.

The material constituting the image for detection of the present disclosure may also contain two or more types of organic compounds. The two or more types of organic compounds are contained, so that it may also be possible to provide a feature of each of the organic compounds by the detection apparatus 150, for example. For example, two or more types of organic compounds whose volatilization rates are different may also be contained so as to sustain a generation time period of the volatile gas.

The material constituting the image for detection of the present disclosure may also be a material that is invisible. In a case where the material constituting the image for detection is a material that is invisible, even though the image for detection 202 is provided overlapped over the image 200 formed on the recording medium P, as shown in FIGS. 4A to 4C, the reading of the image 200 is not disturbed.

The material constituting the image for detection of the present disclosure may also contain a coloring material (for example, pigment, dye and the like) for coloring the image for detection. The recording material of the present disclosure may also contain a resin (for example, polyester resin, acrylic resin and the like) from a standpoint of fixability on the surface of the recording medium. The recording material of the present disclosure may also contain a solvent from a standpoint of securing flowability of the recording material.

Examples of the material constituting the image for detection of the present disclosure include a liquid composition or a paste composition. The liquid composition may be, for example, ink.

As a material of the liquid composition, ink for inkjet recording, ink that is charged in a pen-shaped device, and ink for stamp may be exemplified. As a material of the paste composition, paste for stamp, paste for screen print, and paste for offset print may be exemplified.

[Detection Apparatus 150]

Subsequently, an example of the detection apparatus is described.

Figure 7:
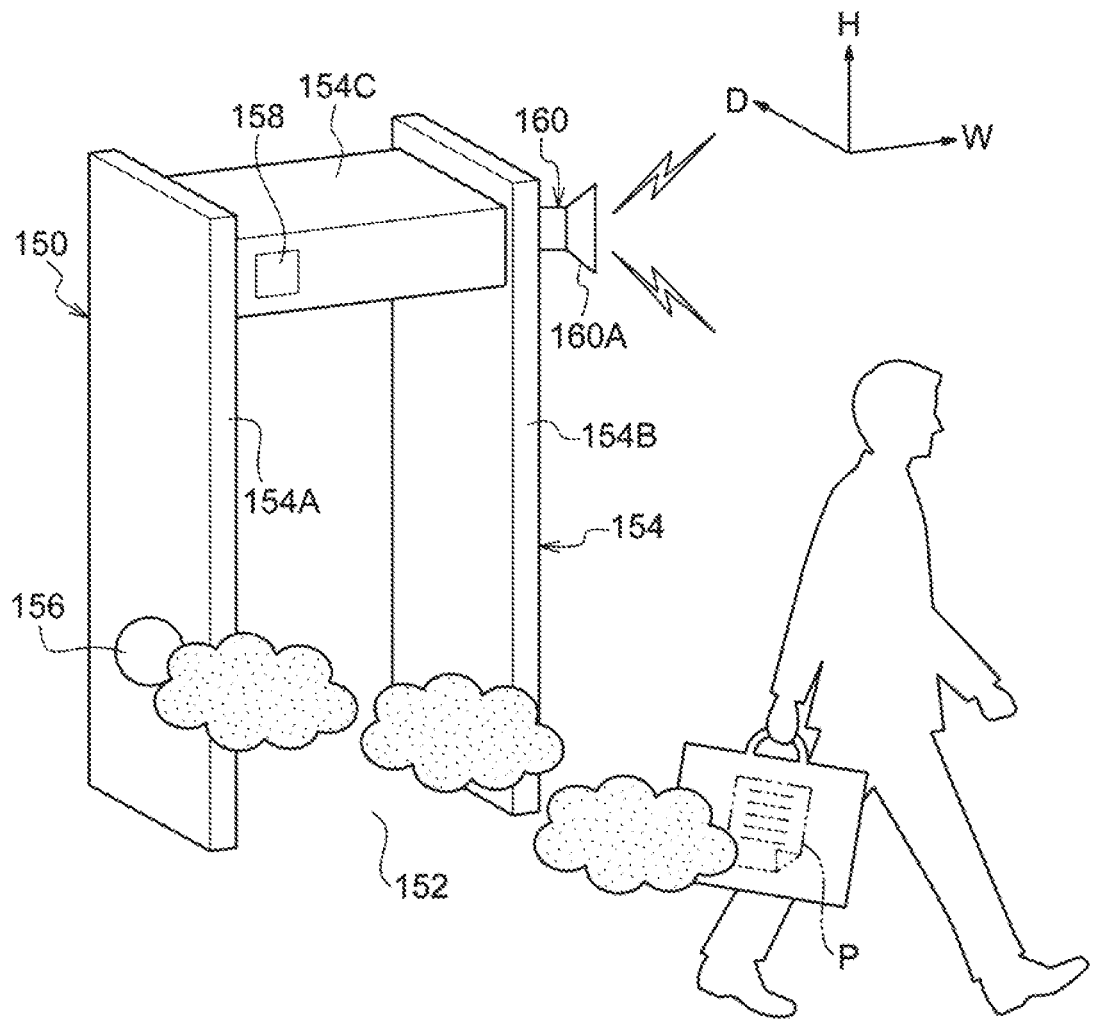
FIG. 7 is a perspective view depicting an example of a detection apparatus configured to detect an image for detection on a recording medium, in a system including the image forming apparatus in accordance with the first exemplary embodiment.

As shown in FIG. 7, the detection apparatus 150 includes a gate 154 equipped on a floor 152, and a sensor 156 as an example of the detection unit configured to detect the image for detection 202 provided to the recording medium P. The detection apparatus 150 also includes an alert generation device 160 configured to generate an alert, and a control unit 158 electrically connected to each of the sensor 156 and the alert generation device 160.

The floor 152 is a floor surface on which a user walks. For example, a user who has the recording medium P having an image formed thereon walks.

The gate 154 has a pair of left and right sidewall parts 154A and 154B, and an upper wall part 154C bridged on the sidewall pans 154A and 154B. The gate 154 is configured so that a person goes in and comes out. For example, a user who has the recording medium P having an image formed thereon walks between the sidewall parts 154A and 154B of the gate 154. As an example according to the exemplary embodiment of the present disclosure, the gate 154 is provided at an exit of a room in which the image forming apparatus 10 is arranged. Thereby, a system including the image forming apparatus 10 and the detection apparatus 150 is configured. In the system, for example, when an image having a high confidential level is formed on the recording medium P by the image forming apparatus 10, the detection apparatus 150 detects the taking out of the recording medium P.

The sensor 156 has a function of detecting the material constituting the image for detection 202 provided to the recording medium P in a non-contact manner. The sensor 156 is provided on a lower side of one sidewall part 154A. In an example according to the exemplary embodiment of the present disclosure, the sensor 156 detects the volatile gas that is generated (i.e., volatized) from the image for detection 202 provided to the recording medium P.

Figure 8:
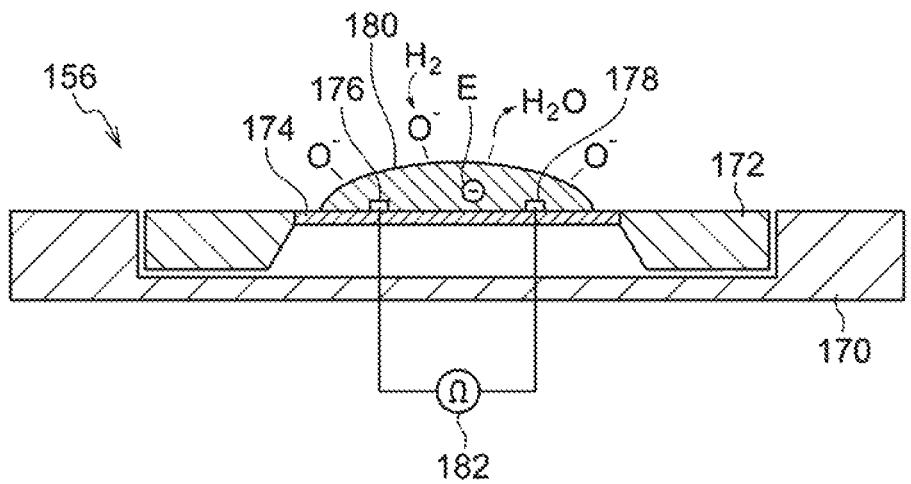
FIG. 8 is a sectional view depicting an example of a sensor provided at the detection apparatus.

FIG. 8 depicts an example of the sensor 156. The sensor 156 is a metal oxide-type gas sensor. As shown in FIG. 8, the sensor 156 includes a case 170, a support part 172 provided to the case 170, a plate 174 supported on the support part 172, and plural electrodes 176 and 178 provided on the plate 174. The support part 172 is formed of silicon. The plate 174 is heated to a predetermined temperature. The sensor 156 also includes a metal oxide layer 180 provided to cover the electrodes 176 and 178 on the plate 174, and a resistance measuring unit 182 configured to measure a resistance value between the electrodes 176 and 178.

In the sensor 156, for example, the oxygen in the air captures electrons of the metal oxide layer 180, and is adsorbed as minus ions $O^-$ on a surface of the metal oxide layer 180. When there is a reducing gas in the vicinity of the metal oxide layer 180, the minus ions $O^-$ on the surface of the metal oxide layer 180 react with the reducing gas (for example, react with the hydrogen of the reducing gas and become water), so that the electrons E moves in the metal oxide layer 180. Thereby, the resistance value that is measured by the resistance measuring unit 182 changes. For example, when a concentration of the volatile gas that is generated from the image for detection 202 is high, at least a part of the volatile gas reacts with the minus ions $O^-$ on the surface of the metal oxide layer 180, so that the electrons E in the metal oxide layer 180 increase. For this reason, it is possible to detect the image for detection 202 provided to the recording medium P by measuring the resistance value between the electrodes 176 and 178 with the resistance measuring unit 182.

As shown in FIG. 7, a signal detected by the sensor 156 is input to the control unit 158. The control unit 158 is configured to control an operation of the alert generation device 160. Ina case where the image for detection 202 is provided to the recording medium P, an image formed on the recording medium P has a high confidential level. The control unit 158 causes the alert generation device 160 to operate when the image for detection 202 of the recording medium P is detected by the sensor 156.

The alert generation device 160 includes a speaker 160A configured to generate an alert such as a warning sound. The alert generation device 160 is provided on an upper side of the sidewall part 154B, for example. When the alert generation device 160 generates an alert, it is possible to notify the surroundings that the recording medium P having the image for detection 202 provided thereto has passed through the gate 154.

Operations and Effects

Subsequently, operations and effects of the present exemplary embodiment are described.

In the confidential information provision device 100, the confidential level of the information about the image formed on the recording medium P is acquired by the information acquisition unit 102A of the control unit 102. The control unit 102 causes the provision unit 104 to operate by the provision control unit 102B according to the confidential level of the information about the image acquired by the information acquisition unit 102A, thereby providing the image for detection 202 to the recording medium P. For example, when the confidential level of the image acquired by the information acquisition unit 102A is higher than the predetermined level, the control unit 102 provides the image for detection 202 to the recording medium P by the provision unit 104. The material constituting the image for detection 202 provided to the recording medium P is detectable in a non-contact manner by the detection apparatus 150.

Describing according to a print process of the image forming apparatus 10, the toner image formed by the image forming unit 12 is transferred to the recording medium P, and the toner image is heated, pressurized and thus fixed on the recording medium P by the fixing device 34. The recording medium P is conveyed to a part facing the confidential information provision device 100, and the image for detection 202 is provided to the recording medium P. Then, the recording medium P is discharged to the discharge part 10b.

For this reason, in a case where a print content of the recording medium P is confidential, the image for detection 202 which is detectable in a non-contact manner may be provided to any location on the recording medium P by the confidential information provision device 100 during a print process. For this reason, in the confidential information provision device 100, it is not necessary to use a special recording medium, as compared to a case where a structure such as a magnetic body is attached in advance to the recording medium. In the confidential information provision device 100, since the image for detection 202 is provided to the recording medium P, a thickness of a part of the recording medium P where the image for detection 202 is provided little changes. For this reason, as compared to a case where a structure such as a magnetic body is attached to the recording medium, handleability of the recording medium is difficult to be deteriorated.

Also, the material constituting the image for detection 202 that is provided to the recording medium P by the confidential information provision device 100 is a volatile material. For this reason, in the confidential information provision device 10, it is possible to provide the recording medium P with the image for detection 202 that is detectable even when there is a shield, as compared to a case where the recording medium is formed with a barcode or a QR code (registered trademark).

Also, in the confidential information provision device 100, as the volatile material, a material that is odorless to persons may be used. Thereby, in the confidential information provision device 100, it is difficult for persons to recognize that the volatile material is applied, as compared to a case where the volatile material has an odor to persons.

Also, in the confidential information provision device 100, as the volatile material, an organic compound having a hydroxyl group or a hydroxyl group and an ether group may be used. Examples of the material that is odorless to persons include an organic compound having a hydroxyl group or a hydroxyl group and an ether group. Thereby, in the confidential information provision device 100, the discomfort that persons feel is suppressed, as compared to a case where an odorous material is used.

Also, in the confidential information provision device 100, as the material constituting the image for detection 202 provided to the recording medium P, a material that is invisible may be used. Thereby, in the confidential information provision device 100, the image for detection 202 is not peeled off from the recording medium P, as compared to a case where a material that is provided to the recording medium by the provision unit is visible.

Also, the image forming apparatus 10 includes the confidential information provision device 100 configured to provide the image for detection 202 to the recording medium P. and the image forming unit 12 configured to form a usual image other than the image for detection 202 on the recording medium P. For this reason, in the image forming apparatus 10, it is possible to provide the image for detection 202 to the recording medium P during a process of forming an image on the recording medium P, as compared to a case where an apparatus configured to form an image on the recording medium and a device configured to provide the confidential information are separately provided.

Also, in the system, the image forming apparatus 10, and the detection apparatus 150 including the sensor 156 configured to detect the image for detection 202 provided to the recording medium P are provided. For this reason, in the system, it is possible to suppress the recording medium P having the image for detection 202 provided thereto after forming an image from being taken out, as compared to a case where only the image forming apparatus 10 is provided.

Also, in the system, the sensor 156 is provided to the gate 154 through which a person goes in and comes out. For this reason, in the system, it is possible to suppress the recording medium P having the image for detection 202 provided thereto from being taken out, as compared to a case where persons go in and out through plural gates.

Also, in the system, the gate 154 is provided with the alert generation device 160 that generates an alert when the sensor 156 detects the image for detection 202. For this reason, in the system, it is possible to suppress the recording medium P having the image for detection 202 provided thereto from being taken out, as compared to a case where an alert is not generated.

Second Exemplary Embodiment

Subsequently, a detection apparatus in accordance with a second exemplary embodiment is described with reference to FIG. 9. Note that, the same constitutional parts as the first exemplary embodiment are denoted with the same reference signs, and the descriptions thereof are omitted.

Figure 9:
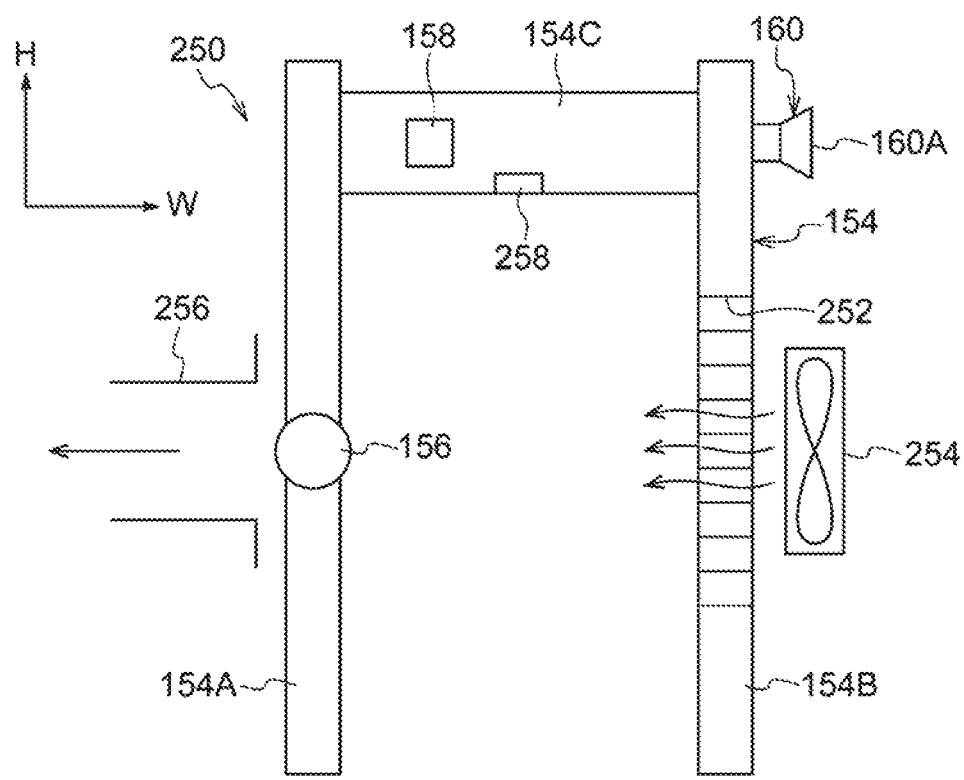
FIG. 9 is a front view depicting a detection apparatus in accordance with a second exemplary embodiment.

As shown in FIG. 9, a detection apparatus 250 of the second exemplary embodiment includes an opening portion 252 formed in the sidewall part 154B facing the sidewall part 154A to which the sensor 156 is provided, and an air stream generation device 254 configured to generate an air stream toward the opening portion 252. The detection apparatus 250 also includes an air stream discharge port 256 arranged on a backside of the sidewall part 154A to which the sensor 156 is provided. The detection apparatus 250 also includes a person detection sensor 258 provided to the gate 154. When the material constituting the image for detection 202 provided to the recording medium P is a volatile material, the sensor 156 detects a volatile gas that is generated from the image for detection 202.

The opening portion 252 is provided in a position of the sidewall part 154B facing the sensor 156. The opening portion 252 has, for example, lattice-shaped openings. The air stream generation device 254 has, for example, a fan capable of sending an air stream by rotation. By the air stream generation device 254, it is possible to generate an air stream toward the sensor 156 through the opening portion 252. The air stream sent from the air stream generation device 254 toward the sensor 156 collides with the sensor 156, flows along a surface of the sidewall part 154A, passes through an outer side of the sidewall part 154A in a width direction, and is discharged from the air stream discharge port 256 on the backside. Note that, an opening for introducing the air stream into the air stream discharge port 256 may also be provided around the sensor 156 of the sidewall part 154B. For example, when the recording medium P having the image for detection 202 provided thereto passes through the gate 154, the air stream generation device 254 generates an air stream from the image for detection 202 passing through the gate 154 toward the sensor 156. Thereby, the volatile gas generated from the image for detection 202 is sent toward the sensor 156 by the air stream generated by the air stream generation device 254.

The person detection sensor 258 is configured to detect a person who enters the gate 154. The person detection sensor 258 is attached on each of both sides of the upper wall part 154C of the gate 154 in an entering direction of the person, for example. Thereby, the person detection sensor 258 detects a person who is approaching toward the gate 154.

The control unit 158 is electrically connected to the air stream generation device 254, and is configured to control an operation of the air stream generation device 254. The control unit 158 is electrically connected to the person detection sensor 258, and a signal detected by the person detection sensor 258 is input to the control unit 158. When the person detection sensor 258 detects that a person enters the gate 154, for example, the control unit 158 causes the air stream generation device 254 to operate. Also, when it is detected that a person is approaching toward the gate 154, the control unit 158 may cause the air stream generation device 254 to operate immediately before the person enters the gate 154.

The other configurations of the detection apparatus 250 are similar to the detection apparatus 150 of the first exemplary embodiment.

A system including the detection apparatus 250 realizes following operations and effects, in addition to the operations and effects by the similar configurations to the system including the detection apparatus 150 of the first exemplary embodiment.

The system including the detection apparatus 250 is provided with the air stream generation device 254 configured to generate an air stream from the image for detection 202 passing through the gate 154 toward the sensor 156. For this reason, in the system including the detection apparatus 250, it is possible to more easily detect the image for detection 202 provided to the recording medium P, as compared to a case where the air stream is not generated.

In the system including the detection apparatus 250, when the person detection sensor 258 provided to the gate 154 detects that a person enters the gate 154, the air stream generation device 254 is caused to operate. For this reason, in the system including the detection apparatus 250, as compared to a case where an air stream generation device is caused to operate all the time, the air stream generation device 254 is caused to operate only when a person enters the gate 154, so that it is possible to reduce the power consumption.

Third Exemplary Embodiment

Subsequently, a detection apparatus in accordance with a third exemplary embodiment is described with reference to FIG. 10. Note that, the same constitutional parts as the first exemplary embodiment and the second exemplary embodiment are denoted with the same reference signs, and the descriptions thereof are omitted.

Figure 10:
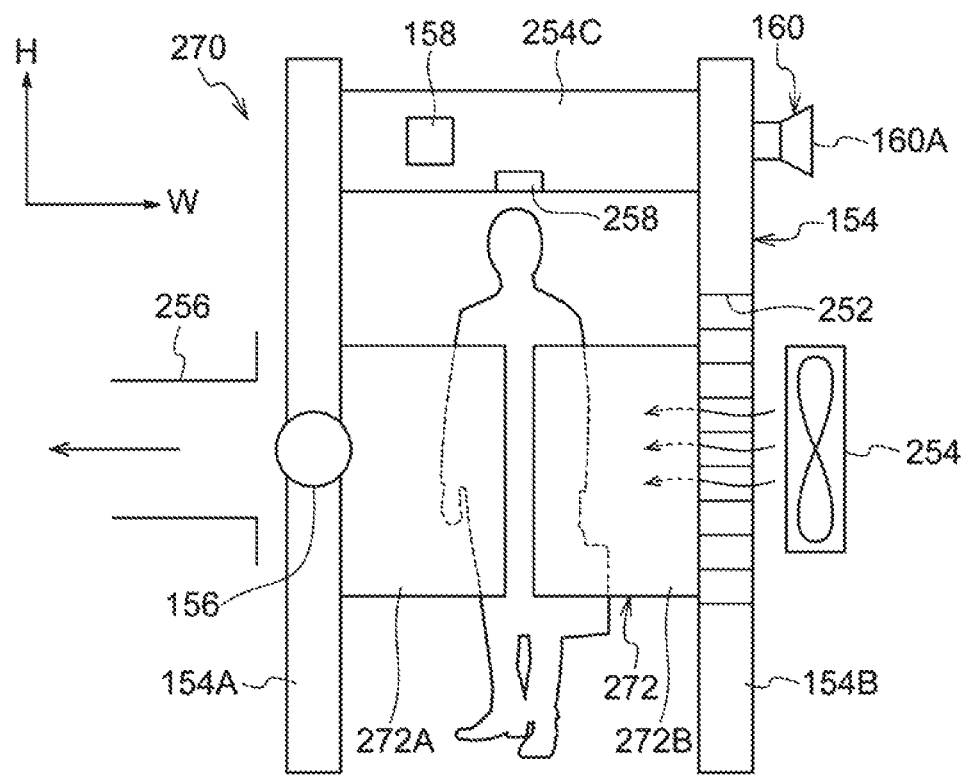
FIG. 10 is a front view depicting a detection apparatus in accordance with a third exemplary embodiment.

As shown in FIG. 10, a detection apparatus 270 of the third exemplary embodiment includes a diffusion prevention member 272 provided on both sides of the gate 154 in a passing direction of a person and configured to restrain diffusion of air from an inside of the gate 154. The diffusion prevention member 272 includes two doors 272A and 272B openably/closably attached to the sidewall parts 154A and 154B. The doors 272A and 272B are configured to rotate from sides along the sidewall parts 154A and 154B to sides intersecting with (in the present exemplary embodiment, orthogonal to) the sidewall parts 154A and 154B by rotation mechanisms (not shown) provided to the sidewall parts 154A and 154B. Thereby, the gate 154 is opened and closed by the doors 272A and 272B. Note that, the diffusion prevention member 272 may also be provided on at least one side of end portions in a passing direction of a person.

The diffusion prevention member 272 is electrically connected to the control unit 158, and the control unit 158 is configured to control operations of the doors 272A and 272B configuring the diffusion prevention member 272. For example, when the recording medium P having the image for detection 202 provided thereto passes through the gate 154, diffusion of the volatile gas from the image for detection 202 is suppressed by the diffusion prevention member 272 in a state where the gate 154 is closed by the diffusion prevention member 272.

When a person enters the gate 154, for example, the control unit 158 may cause the doors 272A and 272B of the diffusion prevention member 272 to operate, thereby once closing both sides of the gate 154 in a passing direction of the person. When the volatile gas from the image for detection 202 is not detected by the sensor 156, the control unit 158 may cause the doors 272A and 272B of the diffusion prevention member 272 to operate, thereby opening the gate 154.

The other configurations of the detection apparatus 270 are similar to the detection apparatus 150 of the first exemplary embodiment. Note that, as the diffusion prevention member 272, a shutter and the like may also be used, instead of the door.

A system including the detection apparatus 270 realizes following operations and effects, in addition to the operations and effects by the similar configurations to the system including the detection apparatus 150 of the first exemplary embodiment.

In the system including the detection apparatus 270, the gate 154 is opened and closed by the diffusion prevention member 272. For example, when the recording medium P having the image for detection 202 provided thereto enters the gate 154, the diffusion of the volatile gas of the image for detection 202 from an inside of the gate 154 is suppressed by the diffusion prevention member 272 in a state where the gate 154 is closed by the diffusion prevention member 272. For this reason, in the system including the detection apparatus 270, it is possible to more easily detect the image for detection 202 (i.e., the volatile gas generated from the image for detection 202) by the sensor 156, as compared to a case where the gate is opened.

Fourth Exemplary Embodiment

Subsequently, an image forming apparatus in accordance with a fourth exemplary embodiment is described with reference to FIGS. 1I to 13. Note that, the same constitutional parts as the first to third exemplary embodiments are denoted with the same reference signs, and the descriptions thereof are omitted.

Figure 11:
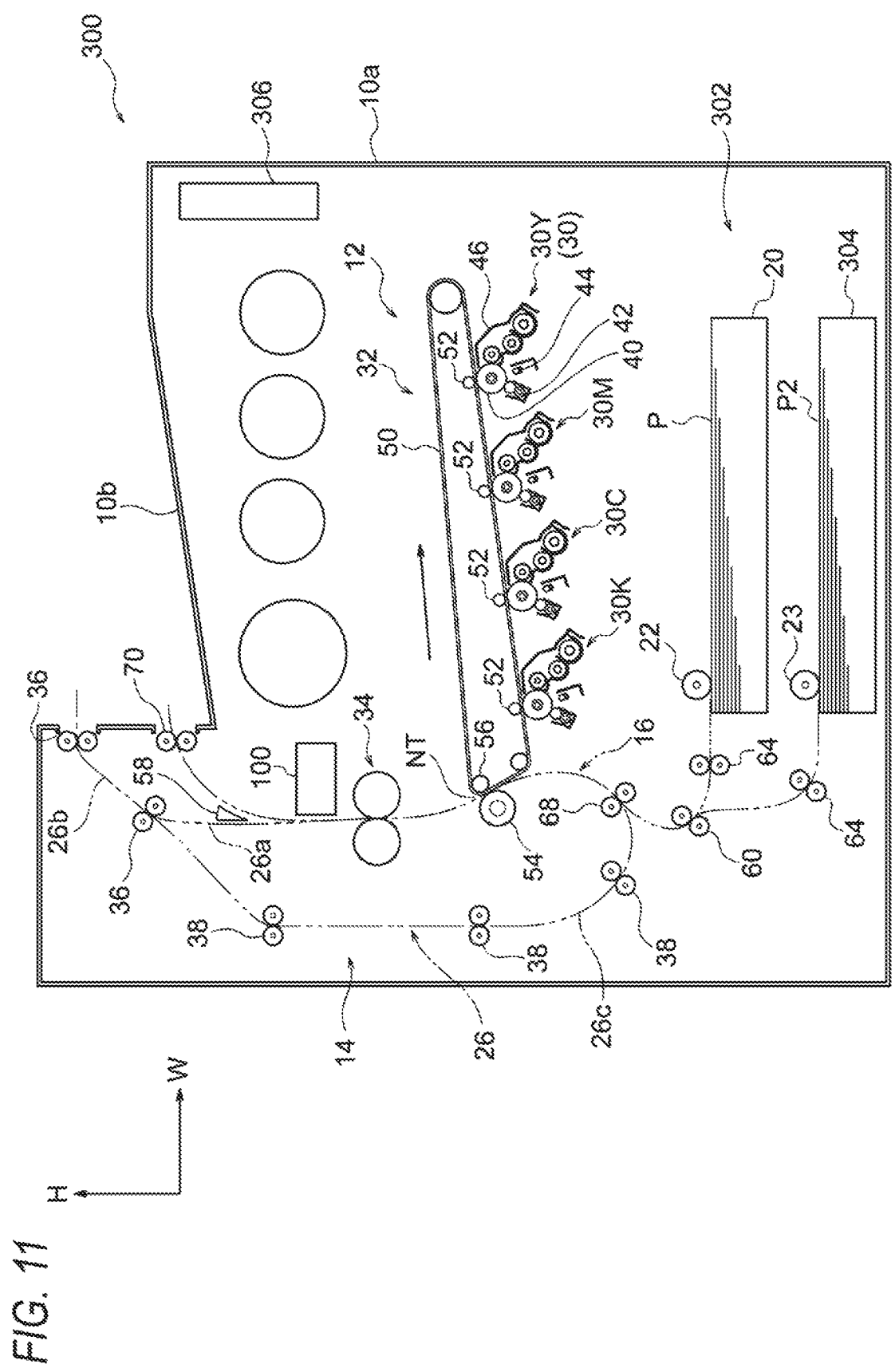
FIG. 11 is a schematic view depicting an image forming apparatus in accordance with a fourth exemplary embodiment.

As shown in FIG. 11, an image forming apparatus 300 of the fourth exemplary embodiment includes a reception unit 302, instead of the accommodation unit 18 provided to the image forming apparatus 10 of the first exemplary embodiment. The reception unit 302 includes plural (two, in an example of the exemplary embodiment of the present disclosure) accommodation members 20 and 304 in which different types of recording media are each accommodated. In the accommodation member 20, the usual recording media P are accommodated, similarly to the image forming apparatus 10 of the first exemplary embodiment. In the accommodation member 304, special recording media P2 each having a magnetic body attached thereto are accommodated.

The image forming apparatus 300 includes a delivery roll 23 configured to deliver the uppermost special recording medium P2 stacked in the accommodation member 304 to the conveying path 16, and a first conveying roll 64 configured to convey the special recording medium P2.

Figure 12:
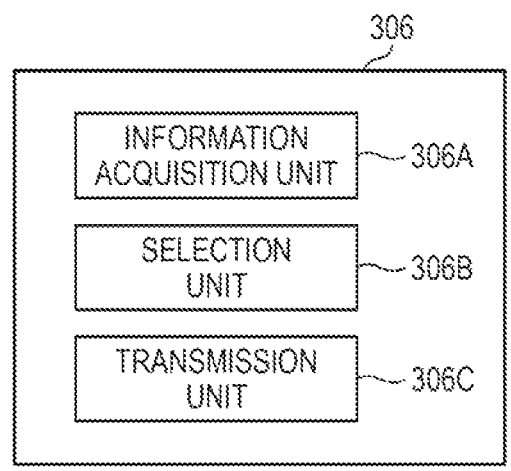
FIG. 12 is a block diagram depicting an example of a functional configuration of a control unit of the image forming apparatus in accordance with the fourth exemplary embodiment.

The image forming apparatus 300 also includes a control unit 306, instead of the control unit 28 of the image forming apparatus 10 of the first exemplary embodiment. As shown in FIG. 12, the control unit 306 includes an information acquisition unit 306A configured to acquire a confidential level of information about an image, a selection unit 306B configured to select a type of the recording medium, and a transmission unit 306C configured to transmit a signal for providing confidential information to the confidential information provision device 100. Although not shown, the control unit 306 includes a CPU (Central Processing Unit: processor), and a storage unit such as a storage.

The selection unit 306B is configured to select a type of the recording medium (i.e., any one of the recording medium P and the special recording medium P2) according to the confidential level of the information about an image acquired by the information acquisition unit 306A. For example, when the information about an image is not a confidential level that should be confidentially managed, the selection unit 306B selects the recording medium P. Thereby, an image is formed on the recording medium P by the image forming unit 12. Also, when the confidential level of the information about an image is higher than a predetermined level (for example, when the confidential level is the highest confidential level 1), for example, the selection unit 306B selects the special recording medium P2 having a magnetic body attached thereto. Thereby, an image is formed on the special recording medium P2 by the image forming unit 12.

Also, for example, when the confidential level of the information about an image that should be confidentially managed is not higher than the predetermined level (for example, when the confidential level is a confidential level 2 lower than the confidential level 1), the selection unit 306B selects, for example, the recording medium P. In this case, the control unit 306 performs control of forming an image on the recording medium P by the image forming unit 12 and providing the image for detection 202 to the recording medium P by the confidential information provision device 100.

When the confidential level, as the confidential level of the information about the image that should be confidentially managed, is not higher than the predetermined level, the transmission unit 306C transmits a signal for providing the image for detection 202 to the confidential information provision device 100. Thereby, the image for detection 202 is provided to the recording medium P by the confidential information provision device 100.

Figure 13:
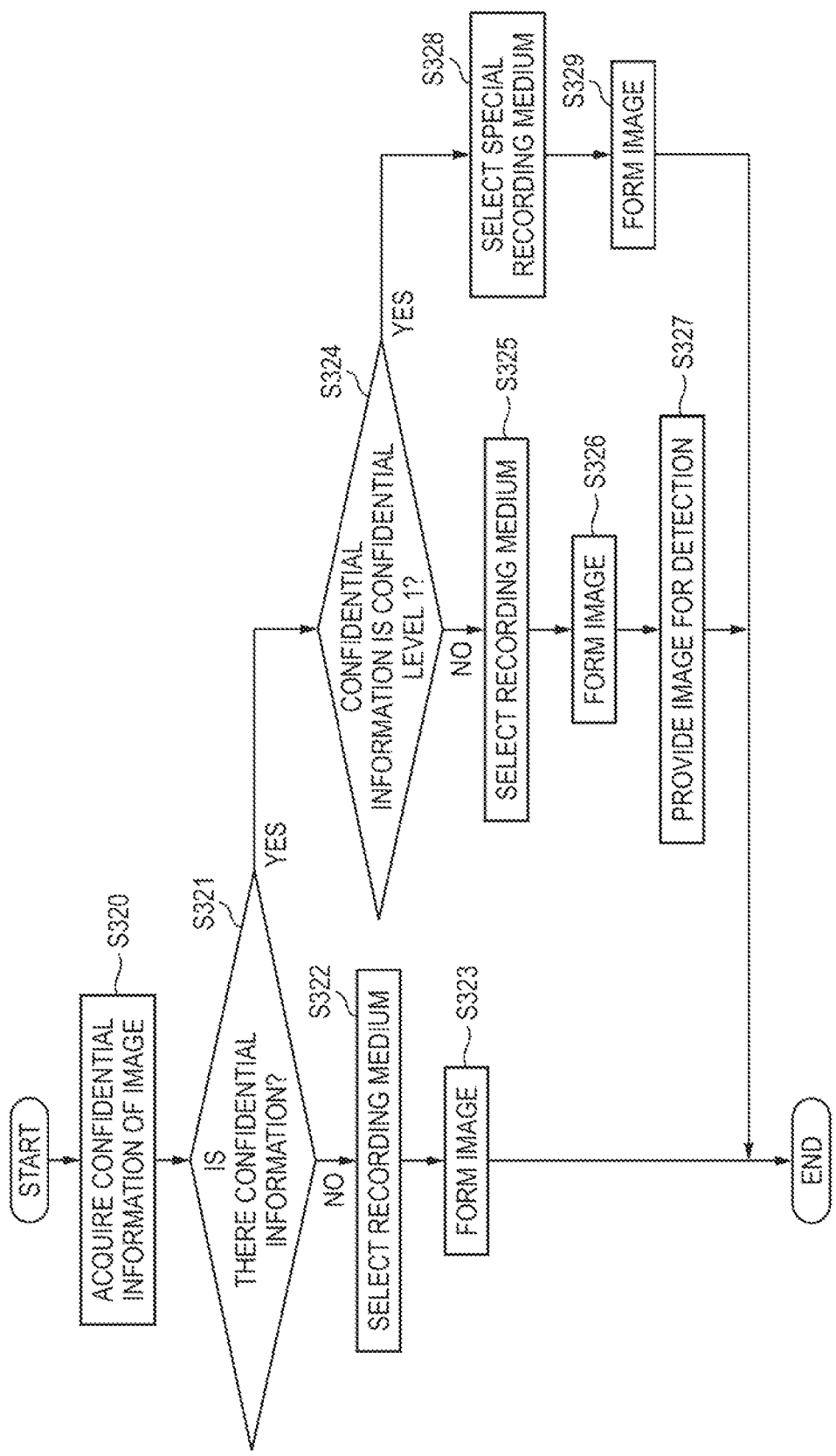
FIG. 13 is a flowchart depicting a flow of confidential information processing by the control unit of the image forming apparatus.

FIG. 13 is a flowchart depicting a flow of processing that is performed by the control unit 306 of the image forming apparatus 300. In the control unit 306, the CPU reads out and executes a confidential information processing program from the storage unit, so that the processing is performed.

As shown in FIG. 13, the control unit 30 acquires confidential information of an image that is to be formed by the image forming unit 12 (step S320). The confidential information of the image is provided to a property and the like of the image, as information about the image.

The control unit 306 determines whether the image has confidential information (step S321). For example, the confidential information that should be confidentially managed is stored in the storage unit, and the control unit 306 determines whether the confidential information that should be confidentially managed is included in the information about the image.

When it is determined that the image has no confidential information (step S321: NO), the control unit 306 selects the recording medium P (step S322).

The control unit 306 forms an image on the recording medium P by the image forming unit 12 (step S323). That is, when the information about the image is not a confidential level that should be confidentially managed, the recording medium P is delivered, so that a usual image is formed on the recording medium P by the image forming unit 12. In this case, the image for detection 202 is not provided to the recording medium P. Thereby, the processing based on the confidential information processing program is over.

When it is determined that the image has confidential information (step S321: YES), the control unit 300 determines whether the confidential information of the image is the confidential level 1 whose confidential level is high (step S324). The confidential information that becomes the confidential level 1 is stored in advance in the storage unit.

When it is determined that the confidential information of the image is not the confidential level 1 (step S324: NO), the control unit 306 selects the recording medium P (step S325). That is, when the confidential information of the image, as the confidential level of the information about the image that should be confidentially managed, is not the confidential level 1 whose confidential level is high (i.e., when the confidential information is not as high as the confidential level 1), the recording medium P is selected.

The control unit 306 forms an image on the recording medium P by the image forming unit 12 (step S326).

The control unit 306 provides the image for detection 202 to the recording medium P by the confidential information provision device 100 (step S327). Actually, the control unit 306 transmits a signal for providing an image for detection to the confidential information provision device 100. The confidential information provision device 100 provides the image for detection 202 to the recording medium P, based on the signal from the control unit 306. That is, when the confidential information of the image is not as high as the confidential level 1, the recording medium P is delivered, so that an image is formed on the recording medium P by the image forming unit 12 and the image for detection 202 is provided to the recording medium P by the confidential information provision device 100. Thereby, the processing based on the confidential information processing program is over.

When it is determined that the confidential information of the image is the confidential level 1 (step S324: YES), the control unit 306 selects the special recording medium P2 having a magnetic body attached thereto (step S328).

The control unit 306 forms an image on the special recording medium P2 by the image forming unit 12 (step S329). That is, when the confidential information of the image is the confidential level 1 whose confidential level is high, the special recording medium P2 having a magnetic body attached thereto is delivered, so that an image is formed on the special recording medium P2 by the image forming unit 12. Thereby, the processing based on the confidential information processing program is over.

Although not shown, the detection apparatus includes a detection unit configured to detect the special recording medium P2 having a magnetic body attached thereto, in addition to the sensor 156 configured to detect the image for detection 202. In many cases, the detection unit configured to detect the special recording medium P2 having a magnetic body attached thereto has a higher detection sensitivity than the sensor 156 configured to detect the image for detection 202 formed of the volatile material, and may easily detects the special recording medium P2.

The image forming apparatus 300 realizes following operations and effects, in addition to the operations and effects by the similar configurations to the image forming apparatus 10 of the first exemplary embodiment.

The image forming apparatus 300 includes the reception unit 302 having the accommodation members 20 and 304 configured to accommodate the different types of the recording medium P and the special recording medium P2. In the image forming apparatus 300, any one of the recording medium P and the special recording medium P2 is selected by the selection unit 306B, according to the confidential level of the information about the image. For this reason, in the image forming apparatus 300, it is possible to select the type of the recording medium, i.e., any one of the recording medium P and the special recording medium P2, according to the confidential level, as compared to a case where one type of the recording medium is used.

In the image forming apparatus 300, when the confidential level of the information about the image is high, the image forming unit 12 forms the image on the special recording medium P2, and when the confidential level of the information about the image is not high, the confidential information provision device 100 provides the image for detection 202 to the recording medium P. For this reason, in the image forming apparatus 300, it is possible to suppress the special recording medium P2 having the high confidential level of the information about an image from being taken out, as compared to a case where the recording medium including a magnetic body is not used.

Fifth Exemplary Embodiment

Subsequently an image forming apparatus in accordance with a fifth exemplary embodiment is described with reference to FIGS. 14 and 15. Note that, the same constitutional parts as the first to fourth exemplary embodiments are denoted with the same reference signs, and the descriptions thereof are omitted.

Figure 14:
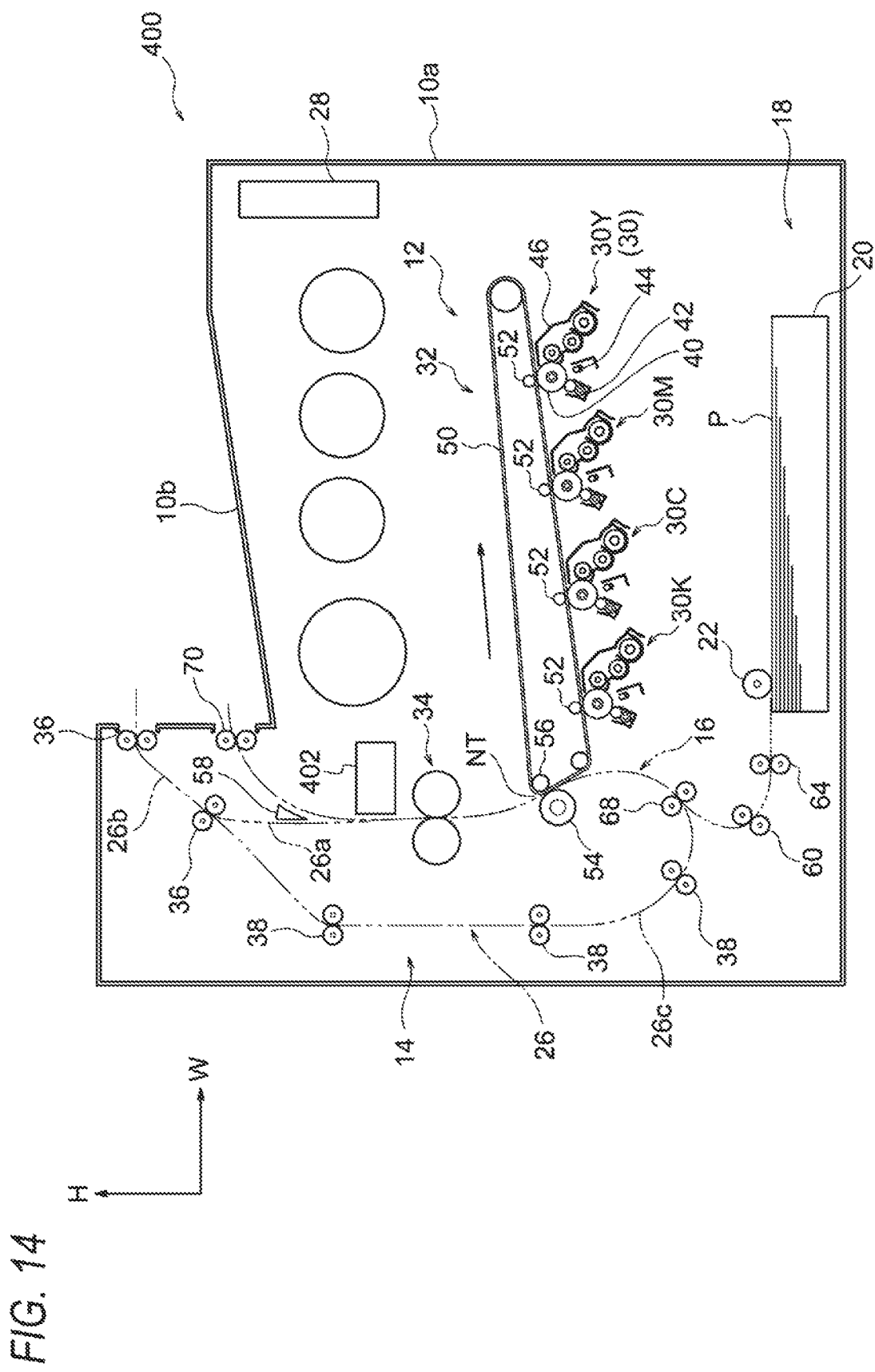
FIG. 14 is a schematic view depicting an image forming apparatus in accordance with a fifth exemplary embodiment.

As shown in FIG. 14, an image forming apparatus 400 of the fifth exemplary embodiment includes a confidential information provision device 402, instead of the confidential information provision device 100 of the image forming apparatus 10 of the first exemplary embodiment. The confidential information provision device 402 uses a provision material that is different from the provision material used in the confidential information provision device 100 of the image forming apparatus 10 of the first exemplary embodiment. Also, similarly to the confidential information provision device 100 of the first exemplary embodiment, the confidential information provision device 402 includes an information acquisition unit 102A configured to acquire a confidential level of information about an image to be printed on the recording medium P, and a provision unit 104 configured to provide confidential information to the recording medium P, according to the confidential level.

[Provision Material that is Used in Confidential Information Provision Device 402]

Here, a provision material that is used in the confidential information provision device 402 is described. The confidential information provision device 402 is configured to provide the recording medium P with the image for detection 202 as an example of the confidential information. For the image for detection 202, a provision material having a reflectance or absorptivity of radio waves that is different from the recording material used when forming the toner image in the image forming unit 12 is used. The provision material forms the image for detection 202 that is attached on the surface of the recording medium P to reflect or absorb at least a part of radio waves whose frequency is equal to or higher than 1 GHz and equal to or lower than 5 THz, thereby enabling the recording medium P to be detected by a detection apparatus 418, which will be described later. The image for detection 202 has only to reflect or absorb at least a part of radio waves whose frequency is equal to or higher than 1 GHz and equal to or lower than 5 THz. The image for detection 202 may reflect or absorb an entire range of radio waves whose frequency is equal to or higher than 1 GHz and equal to or lower than 5 THz, or may reflect radio waves in a certain region having a frequency equal to or higher than 1 GHz and equal to or lower than 5 THz and absorb radio waves in another region.

The recording medium P on which the image for detection 202 is formed by the recording material of the present disclosure is superior in handleability to the special recording medium having the structure 600 attached thereto (refer to FIG. 16). When the recording material of the present disclosure is used, it is also advantageous that there are few restrictions on a type of the recording medium on which the image for detection 202 is to be formed, the manufacturing cost of the recording medium having the image for detection is low, and the thickness of the recording medium having the image for detection is relatively thin and highly uniform, which improves a stacking property.

The image for detection 202 is, for example, an image that reflects or absorbs at least a part of millimeter waves or sub-millimeter waves. The image for detection 202 may be an image that reflects or absorbs at least a part of millimeter waves. The image for detection 202 may be an image that reflects at least a part of millimeter waves. As another example, the image for detection 202 is an image that reflects or absorbs at least a part of terahertz waves.

In the present disclosure, radio waves in a region ranging from a frequency of 30 GHz to a frequency of 300 GHz of radio waves in a region ranging from a frequency of 1 GHz to a frequency of 5 THz are referred to as "millimeter waves", radio waves in a region ranging from a frequency of 300 GHz to a frequency of 3000 GHz (=3 THz) are referred to as "sub-millimeter waves", and radio waves in a region ranging from a frequency of 3 T1 Hz to a frequency of 5 THz are referred to as "terahertz waves".

The image for detection 202 may also be a mesh-shaped image other than the solid image. In a case of the mesh-shaped image, a size of a mesh-shaped lattice diameter (i.e., an opening of a mesh) may be set according to a wavelength of radio waves used in the detection apparatus 150. For example, the size of the lattice diameter of the mesh-shaped image may be set to a size at which radio waves may shield the image for detection 202 (i.e., radio waves are difficult to pass). In a case where the wavelength of radio waves is denoted as λ, the size of the lattice diameter of the mesh-shaped image may be equal to or smaller than ½λ, for example. Also, a line width of the mesh-shaped image may be smaller than a width of the opening. The smaller the size of the lattice diameter of the mesh-shaped image is, the higher the effect of shielding radio waves is.

An example of the exemplary embodiment of the image for detection 202 is an image that reflects or absorbs at least a part of the millimeter waves. As the image for detection 202 that reflects or absorbs at least a part of the millimeter waves, an image that reflects or absorbs at least a part of the millimeter waves in a region ranging from a frequency of 70 GHz to a frequency of 90 GHz may be used. An image that reflects at least a part of the millimeter waves in a region ranging from a frequency of 70 GHz to a frequency of 90 GHz may be used.

The recording material of the present disclosure may contain at least one selected from a group consisting of an electroconductive material, a dielectric material and a magnetic material, so as to form the image for detection. An electroconductive material, a dielectric material or a magnetic material included in the recording material of the present disclosure is included in the image for detection, so that the image for detection exhibits radio wave reflection or absorption performance.

Examples of the electroconductive material, the dielectric material or the magnetic material include metal particles such as silver, copper, nickel and the like; metal powder pigments such as aluminum, brass, bronze, nickel, stainless steel, zinc and the like; metal oxide particles such as indium tin oxide (ITO), tin oxide, indium oxide, zinc oxide, indium zinc oxide and the like; ferrite particles, magnetite particles, carbonyl iron powder, carbon; particles made to have radio wave absorption performance by combining these materials and resin.

The recording material of the present disclosure may also contain a coloring material (for example, pigment, dye and the like) for coloring the image for detection. The recording material of the present disclosure may also contain a resin (for example, polyester resin, acrylic resin and the like) from a standpoint of fixability on the surface of the recording medium. The recording material of the present disclosure may also contain a solvent from a standpoint of securing flowability of the recording material.

Examples of the exemplary embodiment of the recording material of the present disclosure include a liquid composition or a paste composition. The liquid composition is, for example, ink. The recording material may also be heated by the fixing device 34 of the image forming apparatus 10.

As the recording material of the liquid composition, ink for inkjet recording, ink that is charged in a pen-shaped device, and ink for stamp may be exemplified. As the recording material of the paste composition, paste for stamp, paste for screen print, and paste for offset print may be exemplified.

The liquid composition or the paste composition is at least one selected from a group consisting of an electroconductive material, a dielectric material and a magnetic material, and has such a form that a particulate material is dispersed in a solvent.

The image for detection provided to the recording medium of the present disclosure may be an image having an electroconductive property from a standpoint of facilitating detection by the detection apparatus 418.

[Detection Apparatus 418]

Subsequently, an example of the detection apparatus is described.

Figure 15:
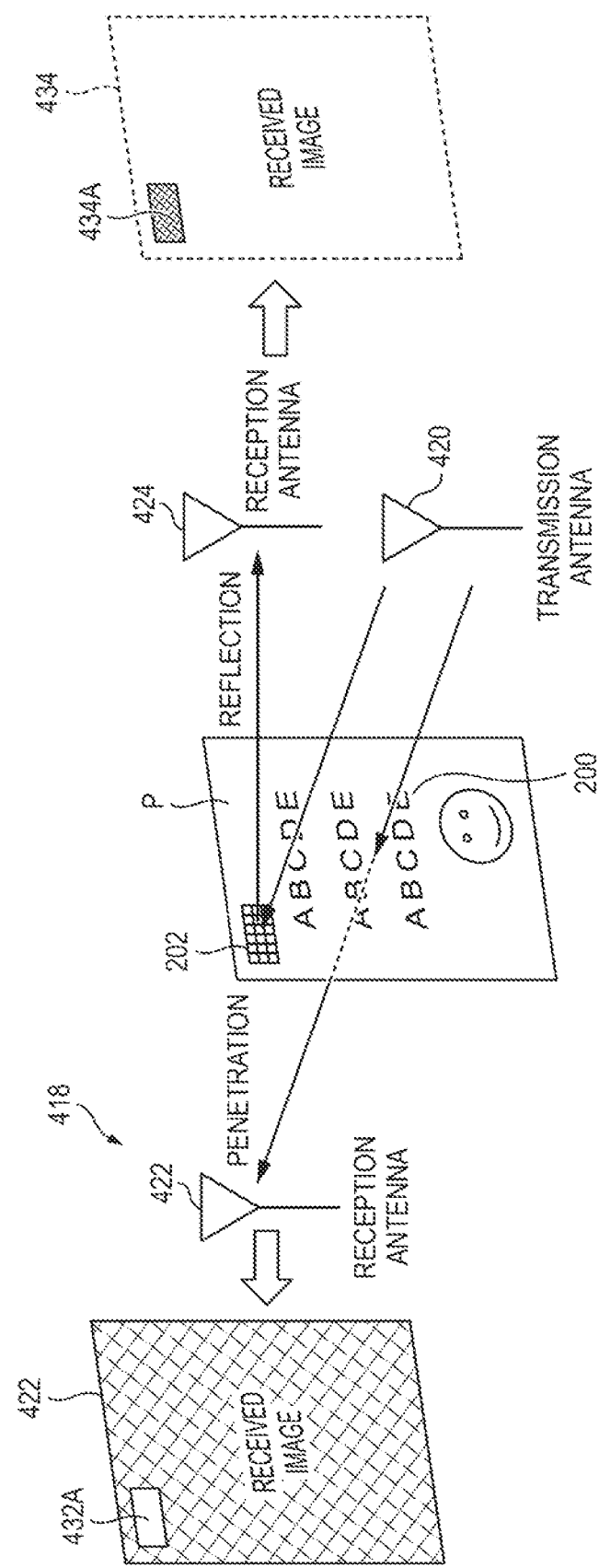
FIG. 15 is a perspective view depicting an example of a detection apparatus configured to detect an image for detection on a recording medium, in a system including the image forming apparatus in accordance with the fifth exemplary embodiment.

As shown in FIG. 15, the detection apparatus 418 includes a transmission antenna 420 configured to transmit radio waves, and a reception antenna 422 configured to receive the radio waves. The transmission antenna 420 and the reception antenna 422 are arranged on both sides with a position through which the recording medium P passes being interposed therebetween. The transmission antenna 420 and the reception antenna 422 are provided on both sides of a gate (not shown), for example, so that a person goes in and comes out of the gate.

In the detection apparatus 418, the transmission antenna 420 is configured to transmit radio waves whose frequency is equal to or higher than 1 GHz and equal to or lower than 5 THz toward a printed material. The reception antenna 422 is configured to detect reflection or absorption of radio waves by receiving the radio waves transmitted from the transmission antenna 420. The transmission antenna 420 and the reception antenna 422 are an example of the detection unit. In an example of the exemplary embodiment of the present disclosure, the radio waves that are transmitted from the transmission antenna 420 are millimeter waves. The transmission antennas 420 and the reception antennas 422 may be provided, and the transmission antennas 420 and the reception antennas 422 may also be provided on different planes.

In an example of the exemplary embodiment of the present disclosure, the detection apparatus 418 is provided at an exit of a room in which the image forming apparatus 400 is arranged. Thereby, a system including the image forming apparatus 400 and the detection apparatus 418 is configured. In the system, when an image having a high confidential level is formed on the recording medium P by the image forming apparatus 400, for example, the detection apparatus 418 detects the taking out of the recording medium P.

In the detection apparatus 418, the transmission antenna 420 transmits radio waves and the reception antenna 422 receives the radio waves, so that it is detected that an image having a high confidential level is formed on the recording medium P. That is, the image for detection 202 is formed on the surface of the recording medium P, so that the image for detection 202 of the recording medium P is detected in a non-contact manner by the transmission antenna 420 and the reception antenna 422. When detecting the image for detection 202 or the recording medium P having the same by the transmission antenna 420 and the reception antenna 422, in a case of detection in a short distance (for example, within 10 m), the detection may be performed with low outputs from the transmission antenna 420 and the reception antenna 422. Therefore, it may be possible to use a relatively small radio wave detection means having a level that has no effect on a human body, so that it may be possible to suppress an effect on the human body. Since the radio waves whose frequency is equal to or higher than 1 GHz and equal to or lower than 5 THz penetrates a shield such as fabric or paper, the image for detection or the recording medium having the same may be detected even though there are shields such as a cloth, an envelope, a bag and the like.

In a case where the recording medium P is formed with the image for detection 202, most of the radio waves pass through (i.e., penetrate) a part of the recording medium P where the image 200 is formed. However, at least a part of the radio waves is reflected or absorbed by the image for detection 202.

In the example shown in FIG. 15, the image for detection 202 is an image for detection that reflects at least a part of the radio waves. In this case, most of the radio waves transmitted from the transmission antenna 420 pass through the part of the recording medium P where the image 200 is formed but at least a part of the radio waves is reflected by the image for detection 202. Thereby, a received image 432 acquired by the reception antenna 422 becomes an image where a part 432A of the image for detection 202 of the recording medium P is missed. For this reason, it is possible to detect the recording medium P having the image for detection 202 formed thereon by the reception antenna 422.

Also, in the detection apparatus 418, a reception antenna 424 configured to receive radio waves may be arranged on the same side as the transmission antenna 420 configured to transmit radio waves toward the recording medium P, instead of the reception antenna 422. In this case, the reception antenna 424 is an example of the detection unit.

A received image 434 acquired by the reception antenna 424 becomes an image where only a part 434A of the image for detection 202 of the recording medium P appears. For this reason, it is possible to detect the recording medium P having the image for detection 202 formed thereon by the reception antenna 424. Although not shown, in the present exemplary embodiment, when the image for detection 202 is detected the detection apparatus 418, an alert is generated by the alert generation device.

The confidential information provision device 402 of the image forming apparatus 400 realizes following operations and effects, in addition to the operations and effects by the similar configurations to the confidential information provision device 100 of the first exemplary embodiment.

In the confidential information provision device 402, the material constituting the image for detection 202 provided to the recording medium P is a material that absorbs or reflects at least a part of radio waves. For this reason, in the confidential information provision device 402, it is possible to detect the image for detection 202 even when there is a shield, as compared to a case where the recording medium is formed with a barcode or a QR code (registered trademark).

In the confidential information provision device 402, the material constituting the image for detection 202 provided to the recording medium P may also be a material (for example, a transparent material) that is invisible. For example, as the material that is invisible, indium tin oxide (ITO) and the like are used. Thereby, even when the surface of the recording medium P is formed with the image 200 and the image for detection 202, only the image 200 is visible and the image for detection 202 is invisible. For this reason, in the confidential information provision device 402, the image for detection 202 is not peeled off from the recording medium P, as compared to a case where a material that is provided to the recording medium by the provision unit is visible.

The system including the detection apparatus 418 realizes following operations and effects, in addition to the operations and effects by the similar configurations to the system including the detection apparatus 150 of the first exemplary embodiment.

In the system including the detection apparatus 418, the transmission antenna 420 transmits radio waves whose frequency is equal to or higher than 1 GHz and equal to or lower than 5 THz toward a printed material, and the reception antenna 422 receives the radio waves transmitted from the transmission antenna 420, so that reflection or absorption of the radio waves is detected. Thereby, the image for detection 202 of the recording medium P is detected in a non-contact manner by the transmission antenna 420 and the reception antenna 422. In a case where the image for detection is formed of the volatile material, the volatile gas from the image for detection may be lost over time. However, the image for detection 202 formed of a material that absorbs or reflects at least a part of radio waves is difficult to be deteriorated. For this reason, in the system including the detection apparatus 418, the image for detection 202 of the recording medium P may be more easily detected, as compared to a case where the confidential information consisting of the volatile material is detected.

Note that, in the first to filth exemplary embodiments, the image forming apparatus includes the confidential information provision device 100; 402, and the image forming unit 12. However, the present disclosure is not limited to the configuration. For example, the confidential information provision device 100; 402 may be configured so that it is independently traded in the market. For example, the image forming apparatus including the image forming unit 12 may be provided with the confidential information provision device 100; 402 through post-mounting. Also, the confidential information provision device 100; 402 may be provided with the image forming unit 12 through post-mounting.

In the first to fourth exemplary embodiments, the image for detection 202 is configured by the volatile material, and the recording medium P to which the image for detection 202 is provided by the confidential information provision device 100 is discharged to the discharge part 10b. However, the present disclosure is not limited to the configuration. For example, an airtight discharge tray may be provided downstream of the switching roll 36 with respect to the conveying direction, the recording medium P to which the image for detection 202 is provided by the confidential information provision device 100 may be discharged to the airtight discharge tray, and the recording medium P on which only a usual image is formed may be discharged to the discharge part 10b. Thereby, in the image forming apparatus, it is possible to suppress the image for detection 202 formed of the volatile material from being contaminated and the like, as compared to a case where the recording medium having the confidential information provided thereto is discharged to the usual discharge part.

In the image forming apparatuses 10 and 300 of the first to fourth exemplary embodiments, the confidential information provision device 100 configured to provide the image for detection is provided downstream of the fixing device 34 with respect to the conveying direction of the recording medium P. However, the position of the confidential information provision device 100 may be changed. For example, the confidential information provision device 100 may be provided upstream of the image forming unit 12 with respect to the conveying direction of the recording medium P or may be provided between the image forming unit 12 and the fixing device 34. In the first to fourth exemplary embodiments, the volatile material constituting the image for detection may also be provided by a confidential information provision device (not shown) arranged at the accommodation member 20.

In the image forming apparatus 400 of the fifth exemplary embodiment, the confidential information provision device 402 configured to provide the image for detection is arranged downstream of the fixing device 34 with respect to the conveying direction of the recording medium P. However, the positon of the confidential information provision device 402 may be changed. For example, the confidential information provision device 402 may be provided upstream of the image forming unit 12 with respect to the conveying direction of the recording medium P or may be provided between the image forming unit 12 and the fixing device 34.

In the first to fifth exemplary embodiments, when the image for detection is detected by the sensor 156 or the detection apparatus 418, a detection result may be transmitted to the system or the Internet, and an alert log may be left.

Note that, although the present invention has been described in detail with reference to the specific exemplary embodiments, it is obvious to one skilled in the art that the present invention is not limited to the specific exemplary embodiments and a variety of other exemplary embodiments may be made within the scope of the present invention.

EXAMPLES

In the below, the recording material and the recording medium of the present disclosure are further specifically described with reference to Examples. However, the recording material and the recording medium of the present disclosure are not limited to Examples as long as the gist thereof is not exceeded.

Example 1: Detection when Volatile Material is Used as Image for Detection

In the confidential information provision device 100, propylene glycol was used as the volatile material constituting the image for detection. Also, in the detection apparatus 150, a metal oxide semiconductor gas sensor was used as the sensor 156 for detection. The metal oxide semiconductor gas sensor was a sensor XP-329 m available from NEW COSMOS ELECTRIC CO., LTD.

Since a confidential document (the confidential level is high) was determined according to the information about an image, the control unit 102 of the confidential information provision device 100 formed a confidential document on A4 sheet by the image forming unit 12, and applied propylene glycol as a volatile material to the printed sheet by the confidential information provision device 100. Thereby, as the image for detection, propylene glycol that is a volatile material was applied to the recording medium P by 0.02 g.

While carrying the sheet having the image for detection provided thereto with a hand, a person passed a place apart from the sensor 156 of the detection apparatus 150 by 5 cm. A detection value of the sensor 156 increased, and an alert was generated from the alert generation device 160. In the sensor 156, the detection value that was stable within a range from 1 to 5 exceeded 10, which is a threshold value, so that an alert was generated from the alert generation device 160.

Example 2: Detection when Air Stream Generation Device is Used

In addition to the configuration of Example 1, the detection apparatus 250 provided with the air stream generation device 254 and the air stream discharge port 256 was used. At this time, the wind speed was 1.2 m/s at the part where the volatile material, which is the image for detection, was applied. Even when the image for detection was apart from the sensor 156 by 20 cm, it could be detected by the sensor 156.

Example 3: Detection when Gate is Provided with Door

In addition to the configuration of Example 2, the gate 154 was provided with the two doors 272A and 273B as the diffusion prevention member 272. At this time, the wind speed was 1.5 m/s at the part where the volatile material, which is the image for detection, was applied. Even when the image for detection was apart from the sensor 156 by 100 cm, it could be detected by the sensor 156.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A confidential information provision device comprising:
    at least one hardware processor configured to acquire an image that is printed on a recording medium and acquire a confidential level of information of the image based on at least one of a keyword, a sentence, or a figure included in the image; and
    a provider configured to provide confidential information to the recording medium in accordance with the confidential level of information, the confidential information provided to the recording medium being constituted of a material that is detectable in a non-contact manner.

2. The confidential information provision device according to claim 1, wherein
    the material constituting the confidential information provided to the recording medium is a material that absorbs or reflects at least a part of radio waves.

3. The confidential information provision device according to claim 1, wherein
    the material constituting the confidential information provided to the recording medium is a volatile material.

4. The confidential information provision device according to claim 3, wherein
    the volatile material is odorless to a human.

5. The confidential information provision device according to claim 3, wherein
    the volatile material is an organic compound having a hydroxyl group or an organic compound having a hydroxyl group and an ether group.

6. The confidential information provision device according to claim 4, wherein
    the volatile material is an organic compound having a hydroxyl group or an organic compound having a hydroxyl group and an ether group.

7. The confidential information provision device according to claim 1, wherein
    the material constituting the confidential information provided to the recording medium is an invisible material.

8. An image forming apparatus comprising:
    the confidential information provision device according to claim 1; and
    an image forming unit configured to form an image other than the confidential information on the recording medium.

9. The image forming apparatus according to claim 8, further comprising
    an accommodation unit configured to accommodate a plurality of types of the recording medium, and
    a selection unit configured to select a type of the recording medium according to the confidential level.

10. The image forming apparatus according to claim 9, wherein,
    in a case where the confidential level is not higher than a predetermined level, the confidential information is provided to the recording medium by the provision unit, and
    in a case where the confidential level is higher than the predetermined level, the image forming unit forms an image on a recording medium including a magnetic body.

11. A system comprising: the image forming apparatus according to claim 8; and
    a detector configured to detect the confidential information provided to the recording medium.

12. The system according to claim 11, wherein
    the detector is provided at a gate through which a person goes in and comes out.

13. The system according to claim 12, further comprising
    an alert generation device at the gate, the alert generation device configured to generate an alert in response to the confidential information being detected by the detector.

14. The system according to claim 12, further comprising
    an air stream generation device configured to generate an air stream toward the detector via the confidential information passing through inside of the gate in a case where the material constituting the confidential information provided to the recording medium is a volatile material.

15. The system according to claim 14, further comprising
    a person detection sensor at the gate, wherein
    the air stream generation device is caused to operate in response to entry of a person into the gate being detected by the person detection sensor.

16. The system according to claim 14, further comprising
    a diffusion prevention member at at least one side of end portions of the gate in a passing direction of a person, the diffusion prevention member configured to prevent air diffusion from the inside of the gate.

\* \* \* \* \*